US009258677B2

(12) United States Patent
Saha et al.

(10) Patent No.: US 9,258,677 B2
(45) Date of Patent: Feb. 9, 2016

(54) IMPROVING SCALABILITY AND RELIABILITY OF HARDWARE GEO-FENCING WITH FAILOVER SUPPORT

(71) Applicant: Microsoft Corporation, Redmond, WA (US)

(72) Inventors: Sanjib Saha, Sammamish, WA (US); Fernando Gonzalez, Bellevue, WA (US); Shaun Hedrick, Seattle, WA (US); Parmjeet Singh, Seattle, WA (US); Ashish Gadre, Kirkland, WA (US); Frank Gorgenyi, Bremerton, WA (US); Mark Inderhees, Woodinville, WA (US); Janet Schneider, Bellevue, WA (US); Stuart Harper, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 40 days.

(21) Appl. No.: 14/086,810

(22) Filed: Nov. 21, 2013

(65) Prior Publication Data

US 2015/0141037 A1  May 21, 2015

(51) Int. Cl.
*H04W 4/02* (2009.01)
*G01S 19/34* (2010.01)
*G01S 19/48* (2010.01)

(52) U.S. Cl.
CPC .............. *H04W 4/021* (2013.01); *G01S 19/34* (2013.01); *G01S 19/48* (2013.01)

(58) Field of Classification Search
CPC .................................................. H04W 4/021
USPC ............. 455/456.1, 456.3, 456.5, 456.6, 457, 455/461, 40.2, 414.24
See application file for complete search history.

(56) References Cited

U.S. PATENT DOCUMENTS

2008/0174485 A1  7/2008  Carani et al.
2008/0300786 A1  12/2008  Greenberg
(Continued)

FOREIGN PATENT DOCUMENTS

EP  1548456  6/2005
EP  2372306  10/2011
(Continued)

OTHER PUBLICATIONS

International Search Report and Written Opinion for International Application No. PCT/US2014/066250, 16 pages, mailed May 13, 2015.
(Continued)

*Primary Examiner* — Cong Tran
(74) *Attorney, Agent, or Firm* — Timothy Churna; Judy Yee; Micky Minhas

(57) ABSTRACT

Systems and methods disclosed herein may include tracking one or more geo-fences using a GNSS hardware processor within a computing device. The tracking may use at least one GNSS signal. State changes of the one or more geo-fences during the tracking may be saved in a shared state database. The shared state database may be shared between the GNSS hardware processor and an application processor within the computing device. Upon detecting a deterioration of the at least one GNSS signal, tracking the one or more geo-fences may be switched from using the GNSS hardware processor to using the application processor. After the switching, an initial state of each of the one or more geo-fences may be set by using states currently stored in the shared state database prior to the switching.

16 Claims, 15 Drawing Sheets

(56) References Cited

U.S. PATENT DOCUMENTS

| | | | |
|---|---|---|---|
| 2009/0192709 A1 | 7/2009 | Yonker et al. | |
| 2011/0148699 A1 | 6/2011 | Anderson et al. | |
| 2011/0238300 A1 | 9/2011 | Schenken | |
| 2012/0309409 A1 | 12/2012 | Grosman et al. | |
| 2013/0217411 A1* | 8/2013 | Croy | H04W 4/021 455/456.1 |
| 2013/0295955 A1* | 11/2013 | Sheshadri | G01S 19/34 455/456.1 |
| 2014/0045521 A1* | 2/2014 | Grainger | H04W 4/021 455/456.1 |
| 2014/0141795 A1* | 5/2014 | Abraham et al. | 455/456.1 |
| 2014/0370909 A1 | 12/2014 | Natucci, Jr. et al. | |
| 2014/0370910 A1 | 12/2014 | Natucci, Jr. et al. | |
| 2015/0223022 A1* | 8/2015 | Kumar | H04W 4/021 455/456.1 |

FOREIGN PATENT DOCUMENTS

| | | |
|---|---|---|
| WO | WO 2010/080938 | 7/2010 |
| WO | WO 2013/101205 | 7/2013 |
| WO | WO 2013/159217 | 10/2013 |

OTHER PUBLICATIONS

Irvine, "Broadcom Introduces GNSS Location Chip with Geofence Capabilities", Published on: Feb. 20, 2013, 2 pages. Available at: http://www.broadcom.com/press/release.php?id=s741713.

"Navigil Introduces New-Generation Geofencing Based on Multiple Sensors and Embedded Intelligence", Published on: Oct. 29, 2012, 2 pages. Available at: http://www.prweb.com/releases/2012/10/prweb10067568.htm.

Wong, et al., "An AGPS-based Elderly Tracking System", In Proceedings of the First International Conference on Ubiquitous and Future Networks, Jun. 7, 2009, 6 pages.

Ryoo, et al., "Geo-Fencing: Geographical-Fencing based Energy-Aware Proactive Framework for Mobile Devices", In Proceedings of the IEEE 20th International Workshop on Quality of Service, Jun. 4, 2012, 9 pages.

"GeofenceHardware", Published on: Sep. 5, 2013, 6 pages. Available at: https://developer.android.com/reference/android/hardware/location/GeofenceHardware.html.

Second Written Opinion Issued in PCT Application No. PCT/US2014/066250, Mailed Date: Oct. 19, 2015, 6 Pages.

* cited by examiner

IMPROVING SCALABILITY AND RELIABILITY OF HARDWARE GEO-FENCING WITH FAILOVER SUPPORT

BACKGROUND

As computing technology has advanced, increasingly powerful mobile devices have become available. For example, smart phones have become commonplace. The mobility of such devices has resulted in different types of functionality being developed, such as location-based functionality, in which certain actions are taken by the device based on the location of the device. Such location-based functionality (e.g., location-based alerts) are given by creating (or pre-defining) one or more geo-fences on the device and associating certain actions to be performed when the device enters and/or exits the pre-defined geo-fences. While this functionality has many benefits, it is not without its problems. One such problem is that the location-based functionality typically requires a lot of power, especially if the processing is handled by a device processor (e.g., application processor) using limited battery power. Additionally, location-based functionalities using positioning signals can become unreliable if reception of the positioning signals is disrupted and the positioning signals become degraded. Yet another problem is that location-based functionalities often times require the use of large portions of the on-chip memory, causing substantial system delays and inferior responsiveness of the device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, one or more geo-fences may be tracked using a Global Navigation Satellite System (GNSS) hardware processor (such as a Global Positioning System (GPS) hardware processor) within a computing device. The tracking may use at least one GNSS location signal (such as a GPS signal). State changes of the one or more geo-fences during the tracking may be saved in a shared state database. The shared state database may be shared between the GPS hardware processor and an application processor within the computing device. Upon detecting a deterioration of the at least one GPS signal, tracking the one or more geo-fences may be switched from using the GPS hardware processor to using alternate methods for tracking location by the application processor. For example, such location determination methods and techniques may include wireless networking triangulation, cellular positioning, and/or network address positioning. After the switching, an initial state of each of the one or more geo-fences may be set by using states currently stored in the shared state database prior to the switching (e.g., the most recent state stored for each geo-fence in the database).

In accordance with one or more aspects, a computing device may include a GPS hardware processor, an application processor, and a shared state database. The GPS hardware processor may be configured to track one or more geo-fences using at least one GPS signal. The application processor may be configured to take over tracking the one or more geo-fences upon deterioration of the at least one GPS signal. The shared state database may be shared between the GPS hardware processor and the application processor, and may be configured to store state changes of the one or more geo-fences during the tracking.

Upon switching from tracking the one or more geo-fences using the GPS hardware processor to tracking the one or more geo-fences using the application processor, the application processor may set an initial state of each of the one or more geo-fences using states currently stored in the shared state database prior to the switching (e.g., using states in the shared state database immediately prior to the switching). Upon detecting an improvement of the at least one GPS signal, tracking may be switched back from using the application processor to tracking using the GPS hardware processor. After the switching back, an initial state of each of the one or more geo-fences may be set using the states currently stored in the shared state database prior to the switching back (e.g., immediately prior to the switching back).

In accordance with one or more aspects, a computer-readable storage medium having instructions thereon for executing a method may be used. The method may include loading a subset of geo-fences from secondary storage to primary storage for tracking by a computing device. The subset of geo-fences may be selected from a set of available geo-fences stored in the secondary storage, based on a selection criteria. Additionally, the subset of geo-fences may form a monitored region, which may include a system geo-fence (referred herein as "outer geo-fence" or a "boundary geo-fence"), defining the monitored region (as explained herein below). The boundary geo-fence may be created, with a radius corresponding to a distance between a current location of the computing device and an edge of a geo-fence within the monitored region (i.e., the subset of geo-fences), which geo-fence is furthest from the current location of the computing device. Upon detecting a geo-fence event associated with a new location of the computing device in relation to the boundary geo-fence, the method can comprise re-loading a new subset of geo-fences and creating a new boundary geo-fence based on the new location of the computing device.

As described herein, a variety of other features and advantages can be incorporated into the technologies as desired.

DETAILED DESCRIPTION

Overview

Figure 1:
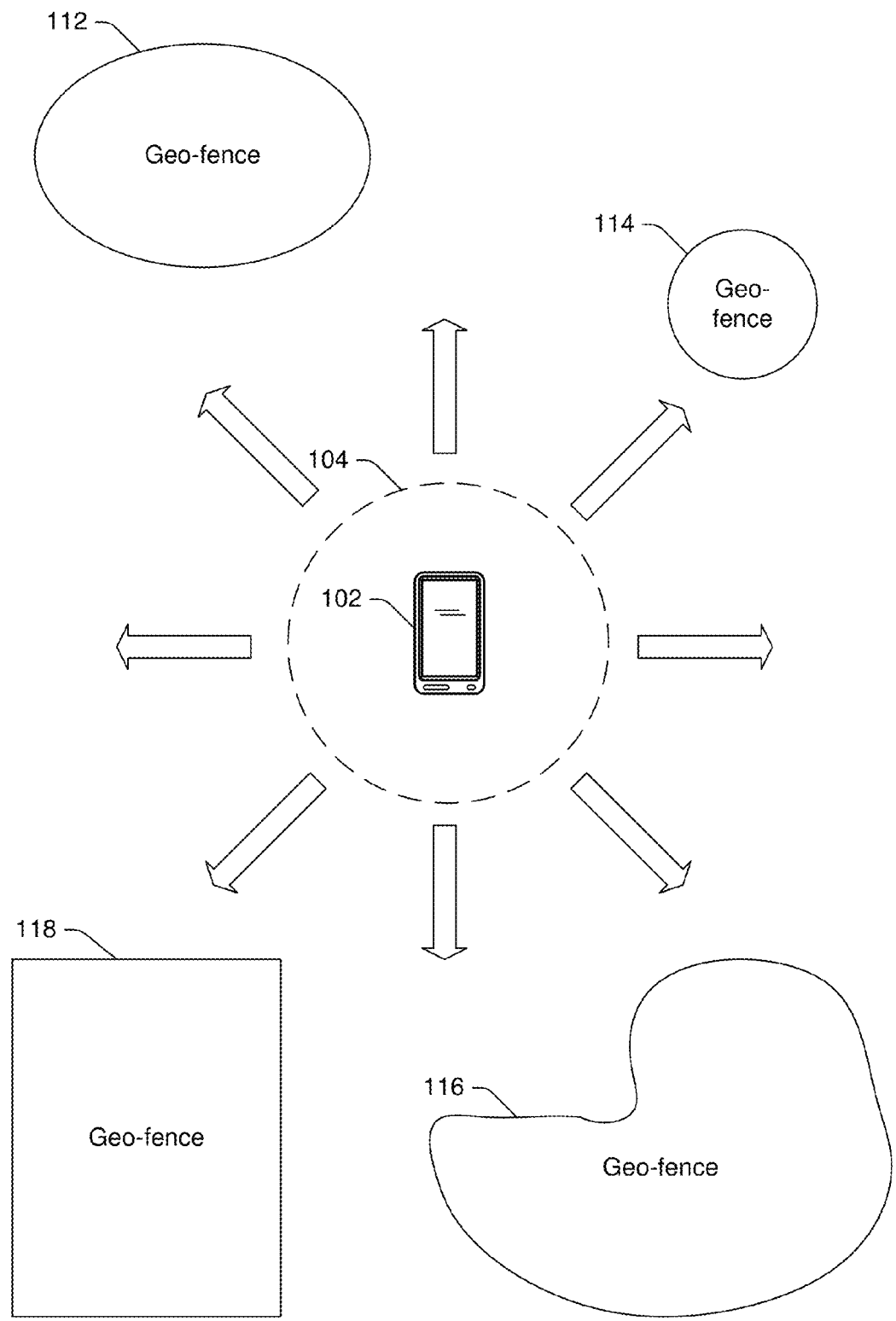
FIG. 1 illustrates an example system in which hardware geo-fencing with failover support discussed herein can be used.

Providing location-based alerts (or geo-fencing) is a common functionality on mobile devices that allows users to specify user-defined actions when the device enters and/or exits certain user-specified locations (e.g., show reminder when the device has entered a home location). This functionality requires the device location platform to periodically acquire the current location of the device to check against pre-registered geo-fences. In some instances, the geo-fence tracking can either be performed natively by a dedicated GPS hardware processor (e.g., a GPS SoC), or it can be performed by the location platform running on the device application processor (AP). Hardware geo-fencing (i.e., geo-fence tracking on a GPS SoC) is highly power-efficient because the continuous location tracking occurs on a low-power processor and the main AP wakes up only for handling location-based alerts.

Even though geo-fence tracking using a dedicated GPS hardware processor is power-efficient, such hardware-based tracking using a dedicated GPS processor may be unreliable. More specifically, the geo-fence tracking by the dedicated GPS hardware processor depends on GPS signal conditions, and the quality of the GPS signal may easily deteriorate (e.g., in urban canyons or indoors). Degraded GPS signal conditions can temporarily disrupt the geo-fence tracking by the GPS hardware processor, and thereby make the end-to-end functionality unreliable. In this regard, geo-fences created around GPS-blind areas can be difficult to track using only a GPS hardware processor. The GPS hardware-based geo-fence tracking may be improved by using additional positioning technologies within the GPS hardware itself. However, due to limited processing capabilities, such alternative technologies may not be robust enough (e.g., due to constraints that may be associated with the GPS hardware processor) to make the user experience highly reliable. Such constraints may be associated with, for example, storage and memory capacity, networking capability, processing power, access to other hardware, and so forth. Thus the hardware based geo-fence tracking, when used by itself, may fail to make the user experience highly reliable.

On the other hand, the location tracking functionalities of the AP is highly reliable as the AP can use numerous complementary location determination techniques to detect the device's location, even in instances when the GPS signal has deteriorated. Such location determination techniques may include wireless networking triangulation, cellular positioning, and/or network address positioning. However, AP-based location tracking is power-consuming since it requires the high-power application processor to periodically wake-up for location tracking. Therefore, exclusively using the AP for continuous location tracking leads to significant power consumption and is inefficient.

As described herein, various techniques and solutions can be applied so that AP-based geo-fence tracking can be used as a failover support to complement the default hardware-based geo-fence tracking by the low-power dedicated GPS hardware processor, to give a reliable user experience without significant power consumption. For example, in instances when there is a deterioration in the GPS signal, geo-fence tracking may fail-over (e.g., switch) from GPS hardware-based tracking to AP-based geo-fence tracking. Upon recovery/improvement of the GPS signal, geo-fence tracking may be switched back to the low-power GPS hardware-based tracking.

In some implementations, the one or more programs 202 within the computing device 102 may utilize a large number of geo-fences, which may create a significant memory burden and make it difficult to track all geo-fences at the same time. Even though it may be desirable for the computing device 102 to be able to accept many geo-fences from each of the one or more programs 202, there are resource costs that increase with the number of geo-fences that are being tracked. For example, a simpler implementation may keep all tracked geo-fences in a list in memory to ensure faster access, which results in a higher memory utilization and cost. When a location change is detected, the entire geo-fence list is scanned to check if a geo-fence was entered or exited, which results in higher processing (CPU) utilization and cost.

Example Geo-Fences

FIG. 1 illustrates an example system 100, in which hardware geo-fencing with failover support discussed herein can be used. The system 100 includes a computing device 102, which can be any of a variety of types of devices, although typically is a mobile device. For example, the computing device 102 can be a smart phone or other wireless phone, a laptop or netbook computer, a tablet or notepad computer, a wearable computer, a mobile station, an entertainment appliance, an audio and/or video playback device, a game console, an automotive computer, and so forth. The computing device 102 is typically referred to as being a mobile device because the device 102 is designed or intended to be moved to multiple different locations (e.g., taken by a user with him or her as the user goes to different locations).

The location of the computing device 102 can be determined using any of a variety of different techniques, such as wireless networking (e.g., Wi-Fi) triangulation, cellular positioning, Global Navigation Satellite System (GNSS) positioning such as GPS signal-based positioning, network address (e.g., Internet Protocol (IP) address) positioning, and so forth as discussed in more detail below. Different location determination techniques can have different accuracy errors or associated uncertainties. For example, a location determination technique may be accurate to 10 meters (m) or 10 kilometers (km). The exact position of the computing device 102 is thus not pinpointed, but is illustrated as an area 104 surrounding the computing device 102. The area 104 represents the uncertainty in the determined location or position of the computing device 102, so although the computing device is determined to be at a particular location or position (e.g., approximately the center of the area 104), the computing device 102 may actually be anywhere within the area 104.

The system 100 also illustrates multiple geo-fences 112, 114, 116, and 118. Each geo-fence 112-118 can be any of a variety of different places of interest to the computing device 102, to the user of the computing device 102, to a program (e.g., an app) running on the computing device 102, and so forth. For example, a geo-fence 112-118 can be the user's home, the user's workplace, restaurants or businesses that may be visited by the user, educational facilities, public services (e.g., hospitals or libraries), geographic places (e.g., cities or states), and so forth.

The location of geo-fences 112-118 is maintained in, or otherwise accessible to, the computing device 102. It should be noted that different users of the computing device 102 can optionally have different geo-fences maintained or accessed. The computing device 102 is mobile and can enter and exit geo-fences 112-118. At any given time, the computing device 102 can be within one of geo-fences 112-118, or within no geo-fence. If the computing device 102 is determined to be within the area that encompasses a particular geo-fence, then the computing device 102 is referred to as being inside or within that particular geo-fence. However, if the computing device 102 is determined to not be within the area that encompasses a particular geo-fence, then the computing device 102 is referred to as being outside or not within that particular geo-fence. Situations can also arise in which two or more geo-fences overlap, in which case the computing device 102 can be within two or more geo-fences 112-118 at one time. It should be noted that the illustration of FIG. 1 is not to scale, and that geo-fences 112-118 can be, and typically are, significantly larger in size than the computing device 102.

In the illustrated example, the area 104 does not intersect any of the geo-fences 112-118, and thus the computing device 102 is outside each of the geo-fences 112-118. However, if the area 104 were to at least partially overlap one of the geo-fences 112-118, then the computing device 102 is possibly inside the geo-fence that is overlapped. Whether the computing device 102 is determined to be inside the geo-fence or outside the geo-fence in such situations can be determined in various manners, such as based on the presence of an overlap, how much of the geo-fences overlap, and so forth.

High-Level Failover Implementation

Figure 2A:
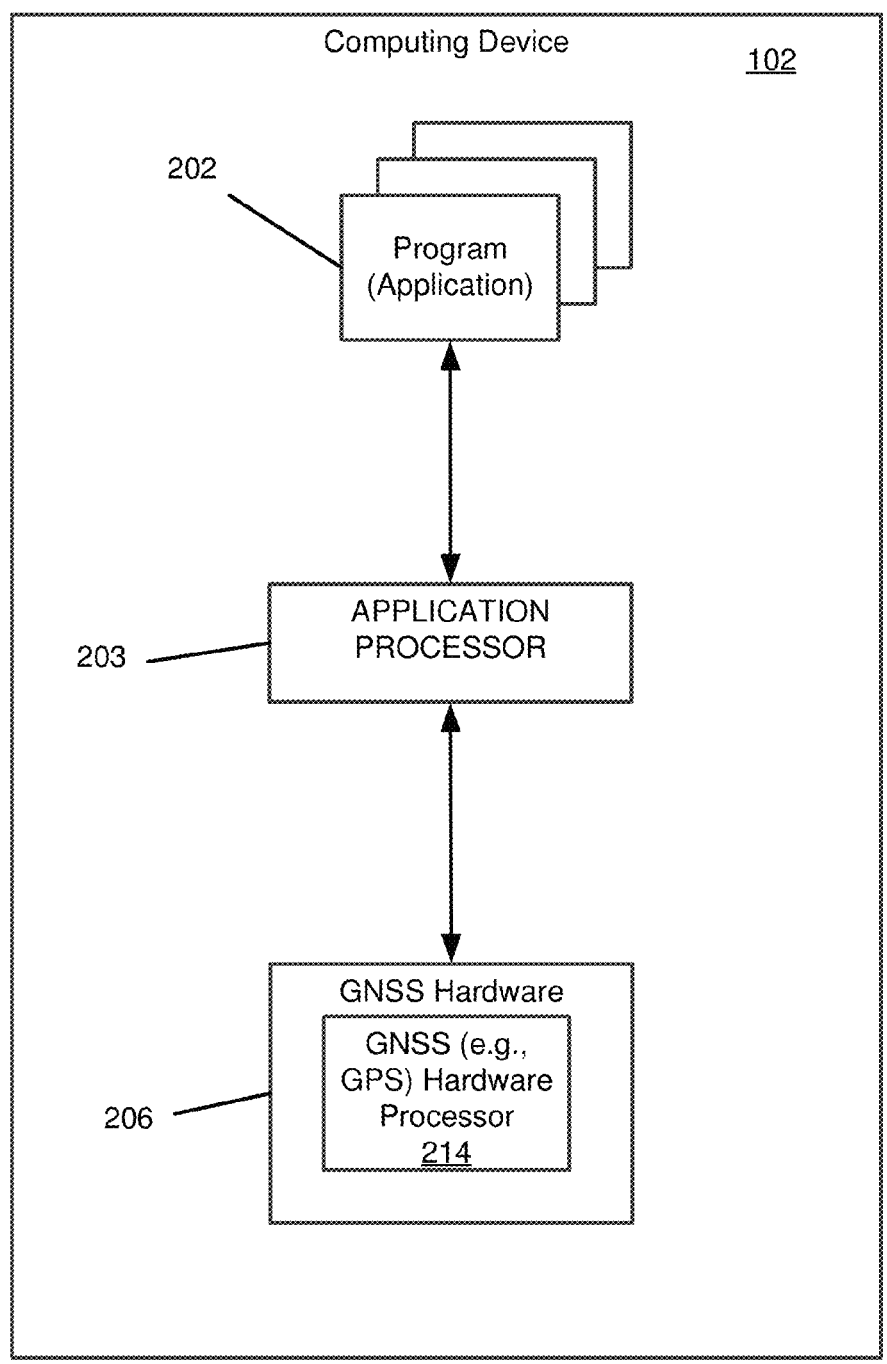
FIG. 2A is a block diagram illustrating an example computing device implementing the hardware geo-fencing with failover support for tracking geo-fences, in accordance with one or more embodiments.

FIG. 2A is a block diagram illustrating an example computing device implementing the hardware geo-fencing with failover support for tracking geo-fences, in accordance with one or more embodiments. Referring to FIG. 2A, the computing device 102 may comprise one or more programs (or applications) 202, an application processor (AP) 203, and GNSS hardware 206.

The one or more programs 202 can include various different types of programs, such as applications (or apps), operating system modules or components, which may be executing on the device 102 using the AP 203.

The AP 203 may comprise suitable circuitry, logic, and/or code and may be operable to provide a location platform (as further explained in reference to FIG. 2B) for managing geo-fence-related functionalities. Such geo-fence-related functionalities may include setting-up new geo-fences, receiving geo-fences (e.g., from the one or more programs 202), tracking geo-fences, and providing one or more breach alerts (e.g., providing entry or exit alerts back to the one or more programs 202) upon a state change of a given geo-fence. For example, the AP 203 may implement a robust geo-fence tracking engine (see e.g., FIG. 2B) for tracking geo-fences. The AP 203 may also implement additional modules to assist the location platform 205 with various other functionalities as described in greater detail below in reference to FIGS. 2B-2C.

The GNSS hardware 206 may be a dedicated (e.g., system-on-a-chip ("SoC")) hardware platform providing low-power navigation-related functionalities, such as tracking of geo-fences. In some instances, the GNSS hardware 206 may implement a GNSS (e.g., GPS) hardware processor 214 (running a GPS engine), which may be used to track geo-fences using a GNSS location signal (e.g., a GPS signal). For simplicity, the GNSS hardware processor 214 will be referred to as a GPS hardware processor 214, but other GNSS-based processors may also be used for implementing the hardware processor 214.

In an example embodiment, the one or more programs 202 may interact with the AP 203 (e.g., with the location platform implemented by the AP 203) to create geo-fences (or receive geo-fences, such as from external storage) and receive entry/exit notifications as the device 102 moves in and out of geo-fences. The one or more programs 202 can choose to receive a subset of event notifications (e.g., either entry or exit) or all event notifications.

Initially, for all geo-fences that have to be tracked, the location platform implemented by the AP 203 pushes the geo-fences to the GPS hardware processor 214 for geo-fence tracking, with the assumption that the GPS signal condition is of good quality. Under normal signal conditions, the GPS hardware processor 214 can track the geo-fences at low-power, even when the AP 203 is inactive. The GPS hardware processor 214 may wake up the AP 203 when a geo-fence event (e.g., an entry or exit event) is triggered due to device movement. However, in instances when the GPS signal conditions deteriorate and the GPS hardware processor 214 is unable to reliably track geo-fences, the GPS hardware processor 214 may notify the location platform to failover (or switch) geo-fence tracking to the more robust (even though less power efficient) geo-fence tracking engine implemented by the AP 203.

The failover (e.g., the switch of geo-fence tracking from the GPS hardware processor 214 to the AP-based geo-fence tracking) can be transparent to the one or more programs 202, and the one or more programs 202 may continue to receive the geo-fence related events as the device 102 moves in and out of geo-fences. Additionally, the GPS engine implemented by the GPS hardware processor 214 may continue to monitor the GPS signal condition changes for improved signal quality. When signal conditions improve and the GPS hardware processor 214 geo-fence tracking using the GPS signal may be resumed, the GPS hardware processor 214 may notify the AP 203 (e.g., the location platform implemented by the AP). After the AP 203 is notified, the power-intensive AP-based geo-fence tracking engine may be shut down and control may be transferred back to the GPS hardware processor 214.

Example Geo-Fence Tracking System with Failover Support

Figure 2B:
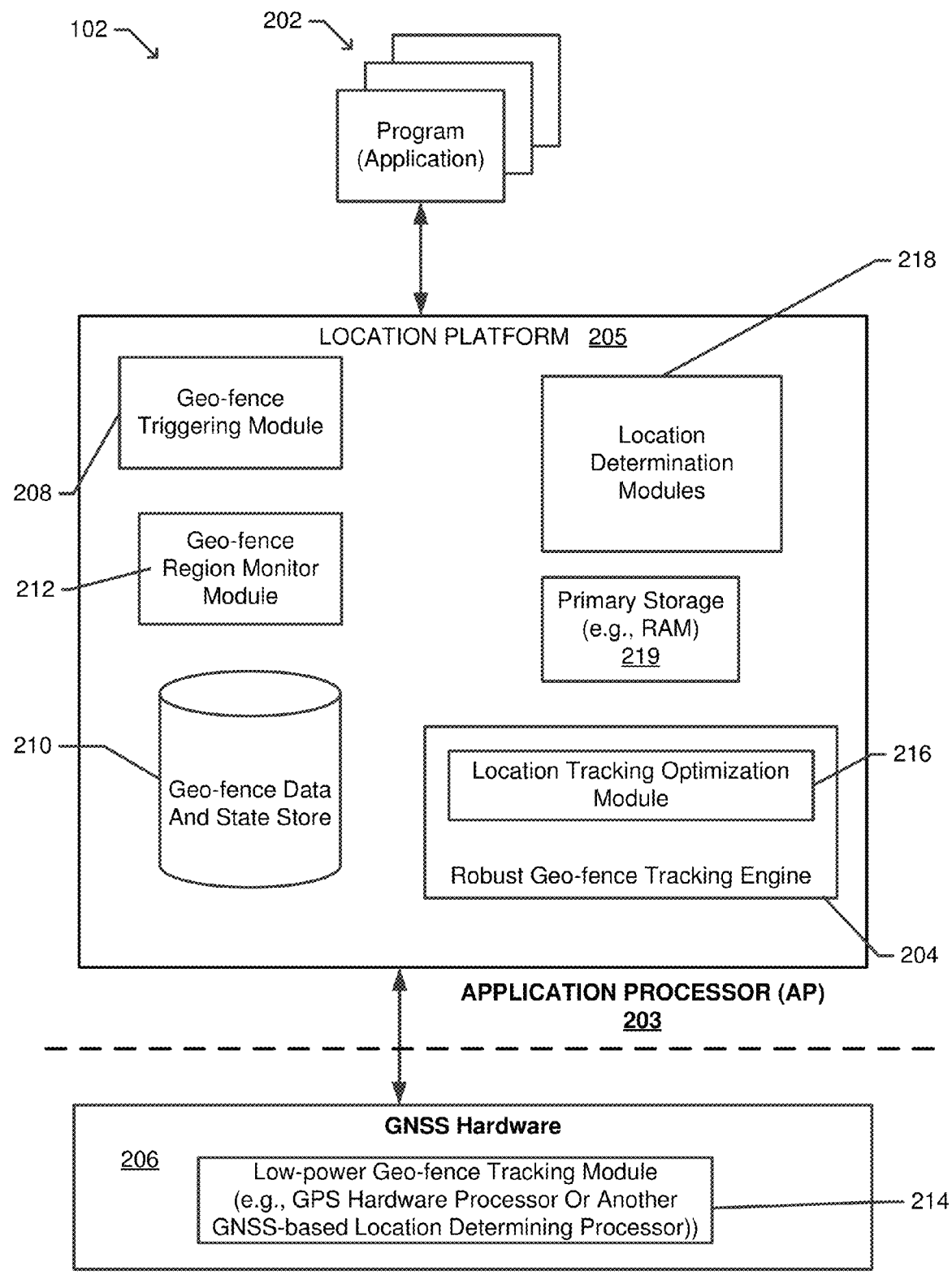
FIG. 2B is a more detailed block diagram of the example computing device of FIG. 2A, implementing the hardware geo-fencing with failover support for tracking geo-fences, in accordance with one or more embodiments.

FIG. 2B is a more detailed block diagram of the example computing device 102 of FIG. 2A, implementing the hardware geo-fencing with failover support for tracking geo-fences, in accordance with one or more embodiments. Referring to FIG. 2B, the computing device 102 may comprise one or more programs (or applications) 202, an application processor (AP) 203, and GNSS hardware 206 (e.g., GPS hardware processor 214). The AP 203 may implement a location platform 205, which may be used to provide navigation and geo-fence managing and tracking functionalities, for example. The AP 203 may be part of the CPU processing core of the device 102, and the GNSS hardware 206 may be implemented separately from the device CPU (e.g., as a SoC GNSS platform, such as a GPS SoC).

The location platform 205 can be implemented by a single device such as the computing device 102 of FIG. 1, or alternatively multiple devices such as the computing device 102 and one or more server computers accessed via a network (e.g., a cellular or other wireless phone network, the Internet, etc.). The location platform 205 includes one or more location determination modules 218, a geo-fence region monitor module 212, a robust geo-fence tracking engine 204, a geo-fence triggering module 208, geo-fence data and state store 210, and primary storage (e.g., RAM) 219.

The geo-fence data and state store 210 maintains various data used by the techniques discussed herein. The geo-fence data and state store 210 can be implemented using any of a variety of different storage devices, such as system memory (e.g., random access memory (RAM)), Flash memory or other solid state memory, magnetic disks, optical discs, and so forth. Even though a separate primary storage 219 is illustrated in FIG. 2B, the present disclosure may not be limited by the type or configuration of memory used. For example, the primary storage 219 and the geo-fence data and state store 210 may be implemented together. In addition, the device 102 may use a secondary storage comprising hard disk drive storage, optical drive storage, and/or flash memory storage. Such secondary storage may be implemented as part of the device 102 or may be implemented remotely from the device 102. Additionally, the primary storage 219, the geo-fence data and state store 210 and any secondary storage (if available for use by the device 102) may be shared between the GPS hardware processor 214 and the AP 203 (e.g., by any of the modules within the location platform 205).

The data maintained in the geo-fence data and state store 210 identifies multiple geo-fences, including geo-fence data for each of multiple geo-fences. Geo-fence data can be obtained from various sources, such as from a distributor or reseller of the geo-fence data and state store 210 that stores the data on the data store 210, from a program running on a computing device implementing the location platform 205 (e.g., from the one or more programs 202), from another device or service, and so forth. The geo-fence data for a geo-fence may describe the boundary of the geo-fence, the criteria to be satisfied in order for the geo-fence to be triggered, as well as one or more states associated with a given geo-fence.

The criteria to be satisfied can refer to a device entering the geo-fence, exiting the geo-fence, staying within the geo-fence for a particular amount of time (e.g., at least a threshold amount of time, no more than a threshold amount of time, etc.), a time period for the geo-fence (e.g., a start time and end time, a start time and a duration), combinations thereof, and so forth. One or more actions that are taken in response to the geo-fence being triggered (the criteria being satisfied) can also be included as part of the geo-fence data. Any of a variety of actions can be taken when a geo-fence is triggered, such as a particular program being notified, particular content being displayed or otherwise played back by the computing device, the geo-fence data being deleted from the geo-fence data and state store 210, combinations thereof, and so forth. Multiple different actions can be taken based on the manner in which the geo-fence is triggered, such as one action taken in response to the device entering the geo-fence, and another action taken in response to the device exiting the geo-fence.

The boundary of the geo-fence can be specified in any of a variety of different manners. For example, the geo-fence can be specified as a position (e.g., latitude and longitude coordinates) and a radius, as a set of positions (e.g., latitude and longitude coordinates of corners of the geo-fence), as a series of vectors, and so forth. In the discussions herein, reference is made to the geo-fences being approximately circular in shape. However, it should be noted that the geo-fences can be any of a variety of regular geometric shapes (e.g., triangles, rectangles, octagons, and so forth), other geometric shapes (e.g., freeform shapes or blobs), and so forth.

The geo-fence state information stored in the geo-fence data and state store 210 may comprise, for example, an INSIDE or OUTSIDE state for one or more of the geo-fences that are being maintained by the device 102. For a given geo-fence, an INSIDE state indicates that the device 102 is within the boundaries of the geo-fence, and an OUTSIDE state indicates that the device 102 is outside the boundaries of the particular geo-fence.

The geo-fence data and state store 210 is illustrated in FIG. 2B as being part of the location platform 205. It should be noted that the data maintained in the geo-fence data and state store 210 can be obtained from the programs 202 (e.g., from the programs 202 as they are loaded in the computing device 102 implementing the location platform 205). Alternatively, one or more of the programs 202 can include a data store that is used in addition to, or in place of, the geo-fence data and state store 210.

The geo-fences can be used in a variety of different manners. For example, a geo-fence and action to be taken can be to alert a user of the computing device 102 implementing at least part the location platform 205 when they are approaching a bus stop, to give the user a coupon when they enter a shopping mall or store, to notify a parent when their child has left school or entered their home, to display weather information for a current location when the user travels to a different city, and so forth.

The location determination modules 218 may comprise suitable circuitry, logic, and/or code and may be operable to determine the location of the computing device 102. A more detailed diagram of the location determination modules 218 is illustrated in FIG. 2C.

Figure 2C:
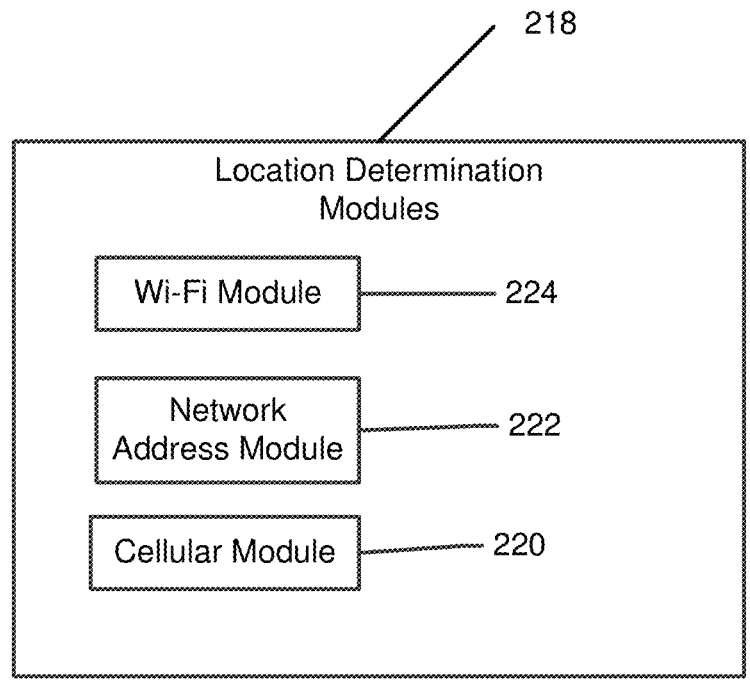
FIG. 2C is a block diagram of location determination modules, which may be used by the example computing device of FIG. 2A, implementing the hardware geo-fencing with failover support for tracking geo-fences, in accordance with one or more embodiments.

FIG. 2C is a block diagram of location determination modules, which may be used by the example computing device of FIG. 2A, implementing the hardware geo-fencing with failover support for tracking geo-fences, in accordance with one or more embodiments. Referring to FIGS. 2B-2C, the location determination modules 218 may include a Wi-Fi module 224, a network address module 222, and a cellular module 220. It should be noted, however, that the modules 220-224 are examples and that the location determination modules 218 need not include each of the modules 220-224 and/or that the location determination modules 218 can include one or more additional modules that determine a location of the computing device 102 in different manners. For example, the location determination modules 218 can include MEMS (Micro-electromechanical systems), cameras, microphones, and so forth. Determining which of the location determination modules 218 is invoked, and when one or more of the location determination modules 218 is invoked, may be based on, for example, current device power requirements.

It should be noted that the location determination modules 218 consume power, and that different amounts of power can be consumed by different ones of the location determination modules 218. If a location determination module A consumes more power than a location determination module B, the location determination module A is referred to as being the higher power location determination module and the location determination module B is referred to as being the lower power location determination module.

The Wi-Fi module 224 uses Wi-Fi signals, such as triangulation of Wi-Fi signals, to determine the location of the computing device 102. The Wi-Fi module 224 can receive signals from various wireless access points, including an identifier of a particular wireless access point and/or a particular wireless network from which a signal is received. For example, a wireless access point may send a media access control (MAC) address of the wireless access point, a basic service set identifier (BSSID) of a wireless network supported by the wireless access point, and so forth. The Wi-Fi module 224 can also measure a strength (e.g., received signal strength indicator (RSSI) values) of these received signals. It should be noted that the Wi-Fi module 224 can, at any given time for any given position of the computing device, receive signals from multiple wireless access points. The Wi-Fi module 224 can maintain or otherwise access a record of wireless access points, signal strengths, and corresponding locations to determine the location of the computing device at any particular time given the wireless access points from which signals are received and the strength of those signals at the particular given time. Alternatively, the Wi-Fi module 224 can provide an indication of the wireless access points from which signals are received and the strength of those signals at a particular given time to a remote service (e.g., accessed via any of a variety of different types of networks) that determines and returns to the Wi-Fi module 224 an indication of the location of the computing device at that particular given time.

The network address module 222 uses network address positioning to determine the location of the computing device 102. The network address used can be any of a variety of network addresses, such as the IP address of the computing device. The network address module 222 can maintain or otherwise access a record of IP addresses or address ranges and corresponding locations to determine the location of the computing device at any particular time given the IP address assigned to the computing device at the particular given time. Alternatively, the network address module 222 can provide an indication of the IP address of the computing device at a particular given time to a remote service (e.g., accessed via any of a variety of different types of networks) that determines and returns to the network address module 222 an indication of the location of the computing device at that particular given time.

The cellular module 220 uses cellular positioning to determine the location of the computing device 102. The cellular module 220 can receive signals from various cell transceivers, including an identifier of a particular cell transceiver (e.g., a cell tower or transceiver identifier), from which a signal is received. The cellular module 220 can also measure a strength of these received signals. It should be noted that the cellular module 220 can, at any given time for any given position of the computing device, receive signals from multiple cell transceivers. The cellular module 220 can maintain or otherwise access a record of cell transceivers, signal strengths, and corresponding locations to determine the location of the computing device at any particular time given the cell transceivers from which signals are received and the strength of those signals at the particular given time. Alternatively, the cellular module 220 can provide an indication of the transceivers, from which signals are received and the strength of those signals at a particular given time to a remote service (e.g., accessed via any of a variety of different types of networks) that determines and returns to the cellular module 220 an indication of the location of the computing device at that particular given time.

Although illustrated as modules separate from the location determination modules 218, it should be noted that one or more of the modules 220-224 can alternatively be implemented at least in part in one of the location determination modules 218. For example, at least part of one or more of the modules 220-224 can be implemented in hardware components as part of the GNSS hardware 206.

The locations determined by the location determination modules 218 are typically latitude and longitude coordinates, although the location can alternatively be specified in other manners. Each of the location determination modules 218 has an associated uncertainty in the location that it determines, also referred to as an accuracy error or estimated accuracy error of the location. The amount of this uncertainty can be determined in various manners, such as being reported by the location determination module itself, being pre-configured in or otherwise accessible to other modules of the location platform 205 (e.g., by the robust geo-fence tracking engine 204), and so forth. The uncertainty results in a position uncertainty area for the location determined by a location determination module, the position uncertainty area being an area within which the computing device 102 may actually be for the determined location.

The geo-fence region monitor module 212 may comprise suitable circuitry, logic, and/or code and may be operable to determine whether one or more of the geo-fences identified in the geo-fence data and store 210 is triggered. Data for numerous different geo-fences can be maintained in the geo-fence data and store 210, and one or more of those geo-fences may be selected by the geo-fence region monitor module 212. The geo-fence region monitor module 212 can make the determination in a variety of different manners, such as based on a current distance between the geo-fences and the computing device 102 (e.g., the distance between a currently determined location of the computing device 102 and a location on the edges (or alternatively other portions) of the geo-fences), based on sizes of (areas encompassed by) the geo-fences, based on the geo-fence tracking parameters as discussed in more detail below, and so forth. The one or more geo-fences that are determined by the geo-fence region monitor module 212 are those deemed more likely to be entered or exited based on various criteria, such as the current location of the computing device 102, and those one or more geo-fences can be the focus of the geo-fence region monitor module 212 until the criteria changes. However, it should be noted that the geo-fence region monitor module 212 can determine whether a geo-fence is triggered for any of the geo-fences in the geo-fence data and state store 210.

The robust geo-fence tracking engine 204 may comprise suitable circuitry, logic, and/or code and may be operable to obtain a current location of the computing device at regular or irregular intervals, and detects whether a geo-fence event occurs. These intervals can be selected dynamically based on current conditions (e.g., approximate distance to a closest geo-fence, power budget for the computing device, an estimated speed of movement of the computing device, and so forth). The robust geo-fence tracking engine 204 may also comprise a location tracking optimization module 216 that determines when to invoke (e.g., activate) one or more of the location determination modules 218 to obtain the location of the computing device. The location tracking optimization module 216 may take into account various power saving techniques in determining which location determination module 218 to invoke and/or when to invoke a location determination module 218.

The term "geo-fence event" may refer to the device 102 entering the geo-fence, exiting the geo-fence, or staying in the geo-fence for a particular amount of time (e.g., being in the geo-fence and not exiting the geo-fence). The robust geo-fence tracking engine 204 may be operable to evaluate the uncertainty associated with the determined location relative to the size of the geo-fence in order to determine whether the computing device 102 is inside the geo-fence or outside the geo-fence. The robust geo-fence tracking engine 204 may also track whether the computing device 102 is inside or outside the geo-fence over time, and thus knows whether the computing device 102 has moved from inside the geo-fence to outside the geo-fence, whether the computing device 102 has moved outside the geo-fence to inside the geo-fence, an amount of time that the computing device has been inside the geo-fence, and so forth.

The geo-fence triggering module 208 may comprise suitable circuitry, logic, and/or code and may be operable to analyze criteria to be satisfied in order for a geo-fence to be triggered, and to determine whether the criteria are satisfied. This determination is made at least in part on the occurrence of one or more geo-fence events as determined by the robust geo-fence tracking engine 204. In response to the criteria being satisfied, the module 208 determines that the geo-fence is triggered and takes the appropriate action. The action taken can be associated with geo-fence data for the triggered geo-fence stored in the geo-fence data and state store 210, or can be determined in other manners such as being pre-configured in the geo-fence triggering module 208, being obtained from another module or device, and so forth.

In one or more embodiments, the action taken by the geo-fence triggering module 208 in response to the geo-fence being triggered is to notify the one or more programs 202. The one or more programs 202 can include various different types of programs, such as applications, operating system modules or components, and so forth. The one or more programs 202 to be notified can be identified in different manners, such as being configured in the geo-fence triggering module 208, being identified as part of the geo-fence data for the geo-fence in the geo-fence data and state store 210, being obtained from another module or service, and so forth. A program 202 can be notified of the geo-fence event that occurred by, for example, communicating a breach alert to the program 202 upon the occurrence of a geo-fence event (e.g., geo-fence enter or exit event), as well as optionally additional information (e.g., that the computing device 102 was within a geo-fence for at least a threshold amount of time). The program 202 can then take the action it desires based on the geo-fence being triggered.

In one more embodiments, a location is determined by the location determination modules 218 only after receiving user consent to do so. This user consent can be an opt-in consent, where the user takes an affirmative action to request that the location be determined by the location determination modules 218 before any such location is determined. Alternatively, this user consent can be an opt-out consent, where the user takes an affirmative action to request that the location not be determined by the location determination modules 218. If the user does not choose to opt out of determining the location, then it is an implied consent by the user to determine his or her location. Furthermore, it should be noted that the location determined by the location determination modules 218 can be maintained in a computing device receiving the determined location (e.g., the computing device 102 of FIG. 1) and need not be communicated to other devices or services.

Alternatively, user consent may be granted for specific programs and revoked for other programs. In this case, location information will be determined only when the user has consented for at least one program for which geo-fence tracking is used. The location information is used to determine the entry and/or exit of only those geo-fences belonging to the consented programs. Remaining geo-fences from the unapproved programs are not tracked.

The GNSS hardware 206 may be a dedicated (e.g., system-on-a-chip, or SoC) hardware platform providing low-power navigation-related functionalities, such as tracking of geo-fences. Additionally, the GNSS hardware 206 may comprise a low-power geo-fence tracking module 214, which may be used to track one or more geo-fences using at least one navigation signal.

The low-power geo-fence tracking module 214 may comprise suitable circuitry, logic, and/or code and may use GNSS positioning to determine the location of the computing device 102. The location of the computing device 102 may be determined based on a particular number of satellites (e.g., four or more satellites) from which the low-power geo-fence tracking module 214 can receive signals or otherwise communicate. The low-power geo-fence tracking module 214 can implement the GNSS functionality using a variety of different technologies, including but not limited to the Global Positioning System (GPS), the Global Navigation Satellite System (GLONASS), the BeiDou (or Compass) navigation system, the Galileo positioning system, combinations thereof, and so forth. In this regard, the GNSS hardware 206 may implement, for example, a GPS hardware processor as the low-power geo-fence tracking module 214, as illustrated in FIGS. 2A-2B and with functionalities discussed herein.

Even though discussions herein may refer to the low-power geo-fence tracking module 214 as the GPS hardware processor 214, this is only one example implementation of the low-power geo-fence tracking module. The GNSS hardware 206 may implement other types of low-power hardware navigation engines as well (e.g., the low-power geo-fence tracking module 214 may be implemented as a GLONASS, a BeiDou (or Compass) navigation system, a Galileo positioning system, or another type of navigation system and/or combinations thereof. Additionally, the low-power geo-fence tracking module 214 operates in any of a variety of public and/or proprietary manners to determine, given the one or more satellites from which the low-power geo-fence tracking module 214 can receive signals or otherwise communicate at any particular given time, the location of the computing device 102 at that particular given time. In an example embodiment, the GNSS hardware 206 (e.g., the low-power geo-fence tracking module 214) may also be adapted to use numerous complementary location determination techniques to detect the device's location, even in instances when the GPS signal has deteriorated. Such location determination techniques may include wireless networking triangulation, cellular positioning, and/or network address positioning.

Figure 3:
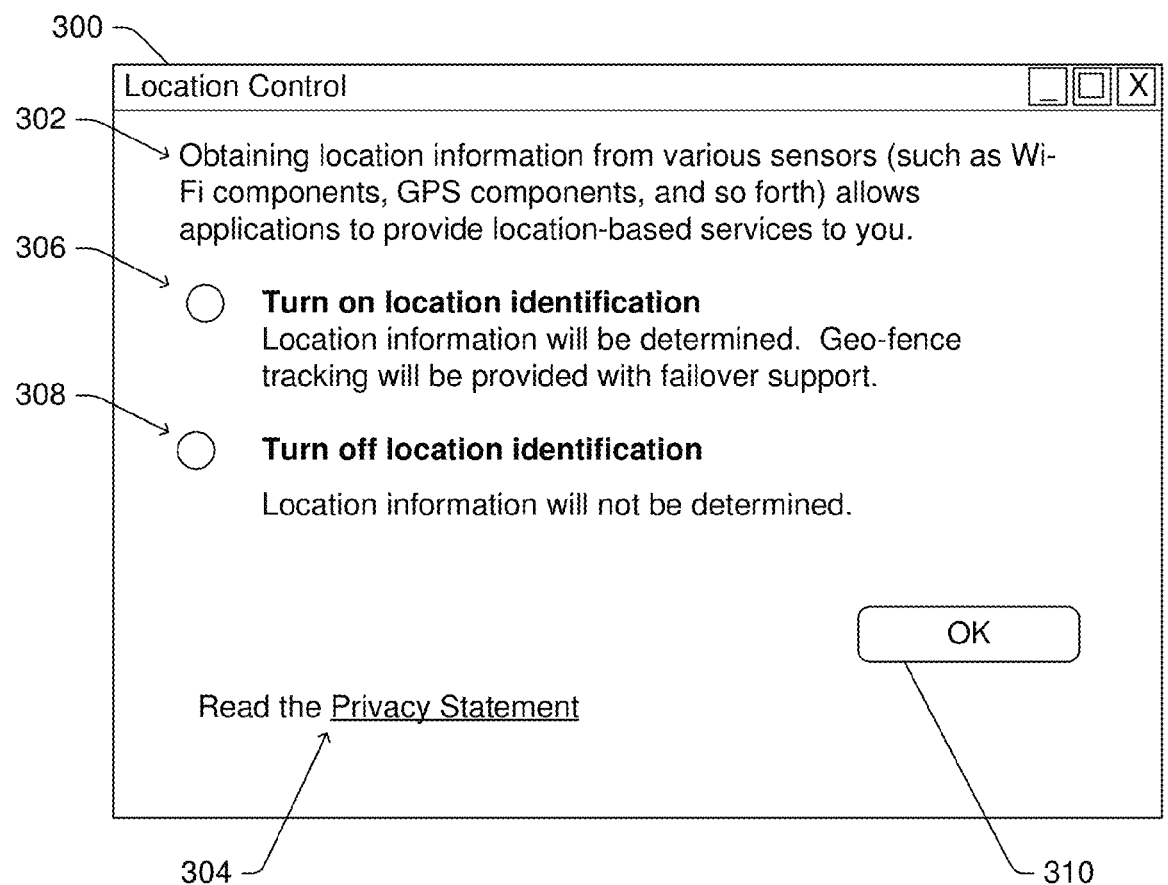
FIG. 3 illustrates an example user interface that can be displayed to a user to allow the user to select whether locations are to be determined in accordance with one or more embodiments.

FIG. 3 illustrates an example user interface that can be displayed to a user to allow the user to select whether locations are to be determined in accordance with one or more embodiments. A location control window 300 is displayed including a description 302 explaining to the user why the location information is being determined A link 304 to a privacy statement is also displayed. If the user selects the link 304, a privacy statement of the system 200 is displayed, explaining to the user how the user's information is kept confidential.

Additionally, the user is able to select a radio button 306 to opt-in to the determining of location information, or a radio button 308 to opt-out of the determining of location information. Once a radio button 306 or 308 is selected, the user can select an "OK" button 310 to have the selection saved. In instances when radio button 306 is selected, geo-fence tracking may be activated with failover support as described herein. It is to be appreciated that radio buttons and an "OK" button are only examples of user interfaces that can be presented to a user to opt-in or opt-out of the determining of location information, and that a variety of other conventional user interface techniques can alternatively be used. The location platform 205 of FIG. 2B may then proceed to determine the location of the computing device (and track one or more geo-fences), or not determine the location of the computing device (and not track any geo-fences), in accordance with the user's selection.

Example Processing Flow of Geo-Fence Tracking with Failover Support

Figure 4:
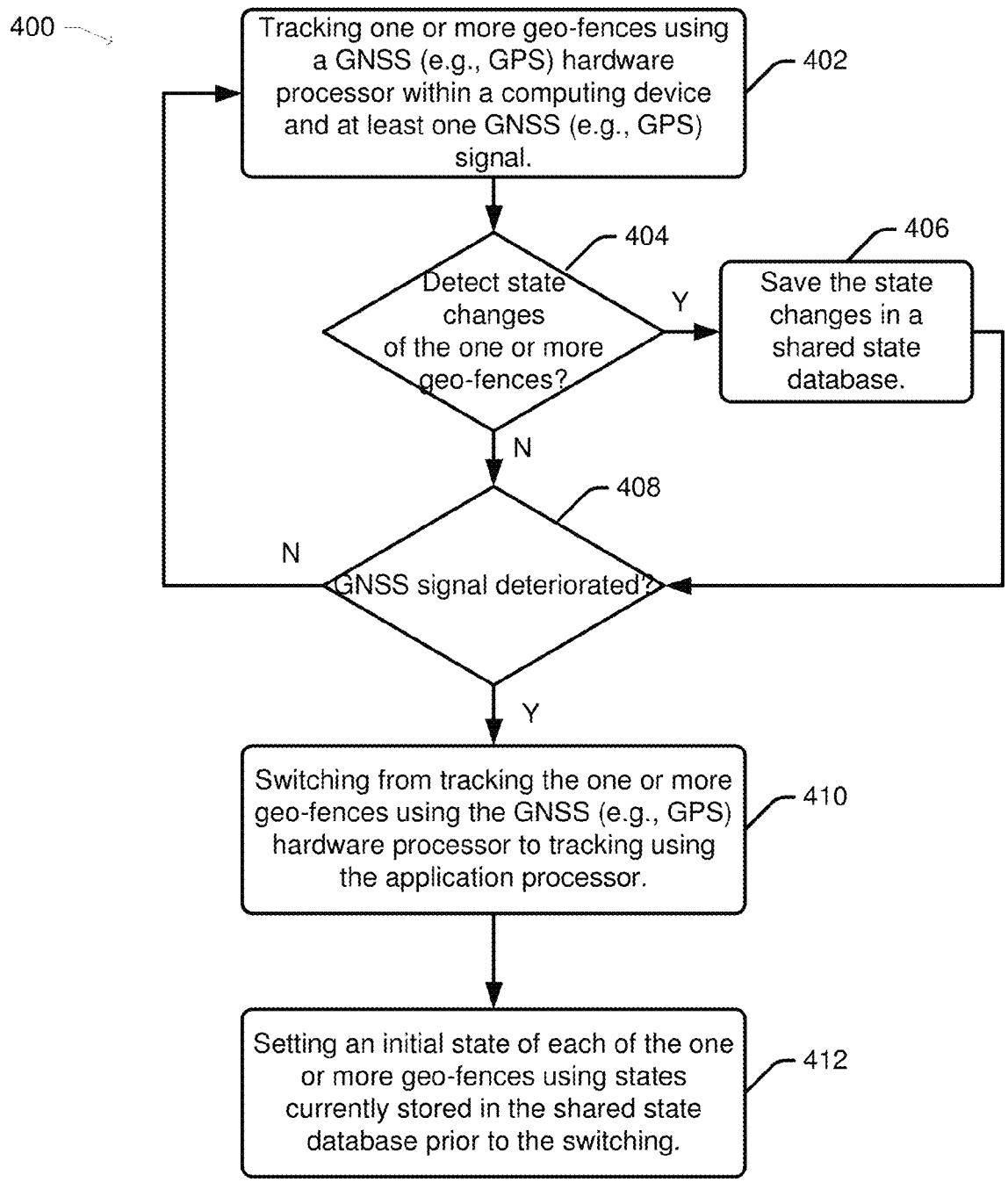
FIG. 4 is a flow diagram illustrating an example process for providing hardware geo-fencing with failover support, in accordance with one or more embodiments.

FIG. 4 is a flow diagram illustrating an example process for providing hardware geo-fencing with failover support, in accordance with one or more embodiments. Referring to FIGS. 2B and 4, the example process may start at 402 when the GPS hardware processor 214 may track one or more geo-fences using at least one GPS signal. For example, for all geo-fences that have to be tracked, the location platform 205 implemented by the AP 203 may push the geo-fences to the GPS hardware processor 214 for tracking. Under normal signal conditions (i.e., the GPS signal is of good quality), the GPS hardware processor 214 can track the geo-fences at low-power, even when the AP 203 is inactive. In this regard, the GPS hardware processor 214 may be initially selected within the device 102 as the default geo-fence tracking engine with an assumption that the GNSS hardware 206 has optimal signal conditions for tracking geo-fences (e.g., GPS signal with good quality).

Figure 5A:
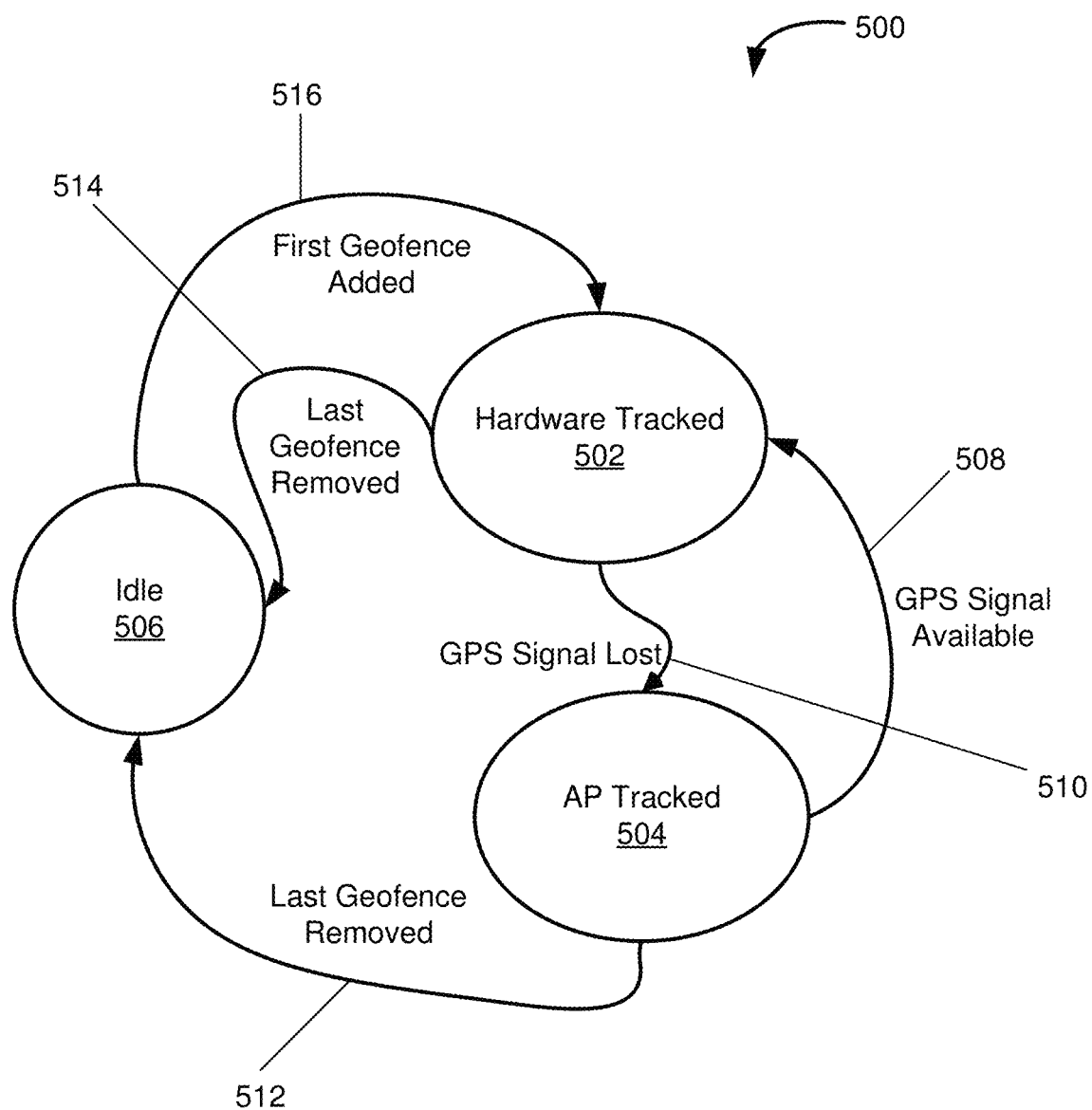
FIG. 5A is a diagram illustrating example state transitions during geo-fence tracking using Global Navigation Satellite System (GNSS) hardware with failover support, in accordance with one or more embodiments.
Figure 5B:
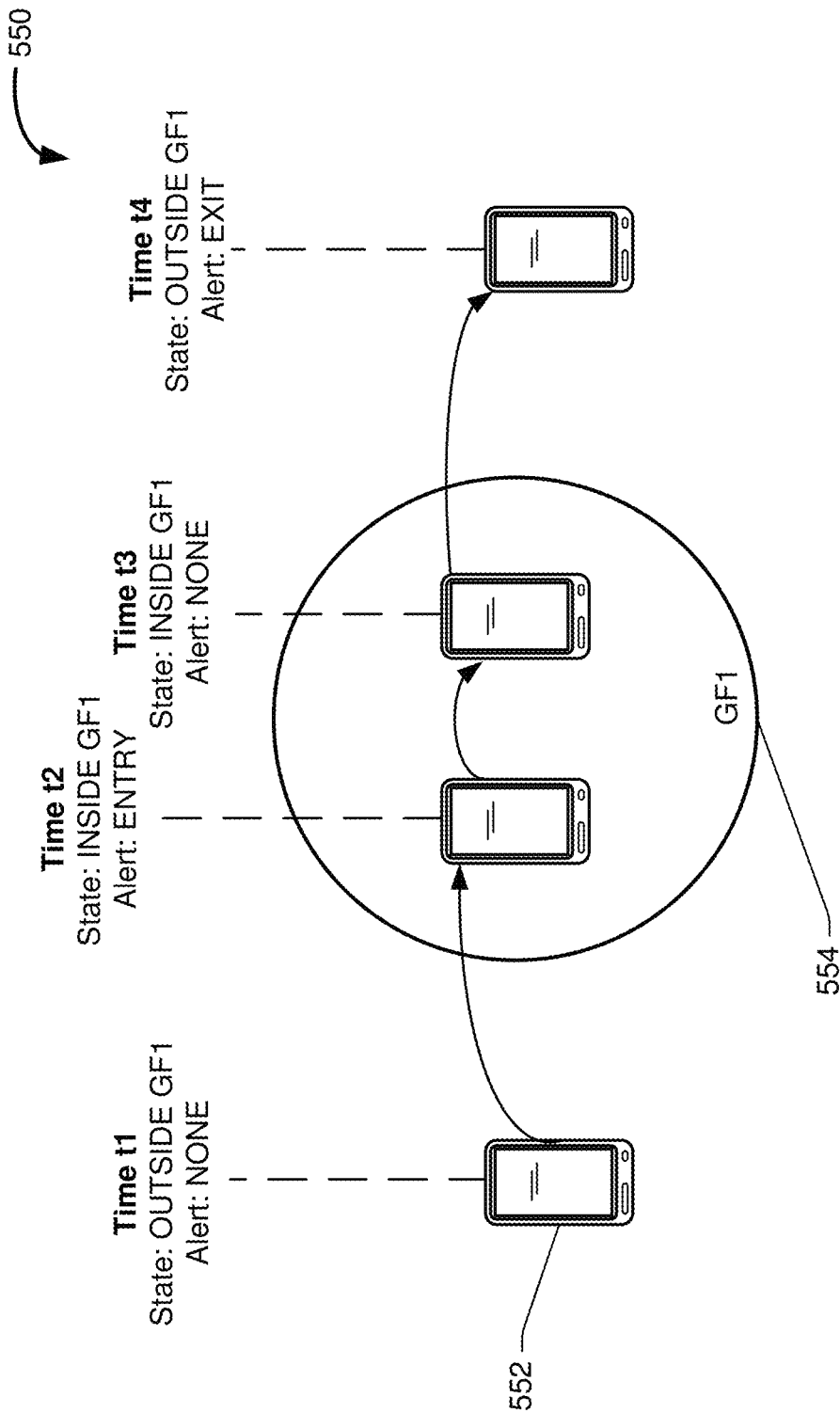
FIG. 5B is a diagram illustrating example state transitions when a computing device enters, travels through, and exits a geo-fence, in accordance with one or more embodiments.

At 404, the GPS hardware processor 214 may detect one or more state changes (e.g., as illustrated in FIG. 5B) in the tracked geo-fences. For example, as the device 102 enters or exits geo-fences, geo-fence enter and exit events can be triggered. Upon triggering a geo-fence enter event (device 102 enters the geo-fence), an entry state change may be triggered and the state of the currently tracked geo-fence may be changed to INSIDE GEO-FENCE. Similarly, upon triggering a geo-fence exit event (device 102 exits the geo-fence), an exit state change may be triggered and the state of the currently tracked geo-fence may be changed to OUTSIDE GEO-FENCE. If it is determined that a state of a geo-fence that is currently being tracked has changed, then the state of the geo-fence may be saved in the shared geo-fence data and state store 210 and optionally in, for example, the primary storage 219 and/or in a secondary storage (e.g., remote or attached storage). In this way, current states of each geo-fence may be maintained in a shared master geo-fence state database, which is accessible by the GNSS hardware 206 as well as by the AP-based robust geo-fence tracking engine 204.

Additionally, one or more breach alerts may be communicated to the one or more programs 202, notifying the programs of any geo-fence entry and/or exit events. Furthermore, the geo-fence engines (the GNSS hardware 206 and the AP-based robust geo-fence tracking engine 204) can keep track and record (e.g., in shared storage such as store 210) both geo-fence entry and geo-fence exit events regardless of whether the one or more of the programs 202 (or the device 102 user) has requested breach alerts for only geo-fence entry events or geo-fence exit events. In this way, the master geo-fence state database (stored in shared storage) may be kept up-to-date with the current state of the geo-fences associated with all geo-fence related events (e.g., all geo-fence enter or exit events may be tracked and corresponding state changes recorded in the master geo-fence data and state store 210), without sending any redundant events up to the end-user.

If it is determined that a state of a geo-fence that is currently being tracked has not changed, then processing may continue at 408, when it may be determined whether the signal quality of the GNSS (e.g., GPS) signal has deteriorated (e.g., if the device 102 is indoors). If the GNSS hardware 206 uses other methods of determining location (e.g., Wi-Fi or cellular signal triangulation), then step 408 may include determining whether the GNSS hardware 206 (i.e., the GNSS hardware processor 214) is no longer able to determine location. If it is determined that the quality of the GNSS signal remains satisfactory, geo-fence tracking by the low-power GNSS hardware processor 214 may continue at 402. However, if the GNSS signal quality has deteriorated (and/or the GNSS hardware processor 214 is no longer able to determine location using other available methods), processing may continue at 410, when tracking the one or more geo-fences may failover (or switch) from tracking using the GNSS hardware processor 214 to tracking the one or more geo-fences using the application processor 203. For example, the GNSS hardware processor 214 may notify the location platform 205 to failover (or switch) geo-fence tracking to the robust geo-fence tracking engine 204 implemented by the AP 203.

After the failover (or switching), at 412, the initial state of each of the one or more geo-fences that are being tracked may be set to a corresponding state that was stored in the shared geo-fence data and state store 210 prior to the switching. After the switching from geo-fence tracking by the GNSS hardware processor 214 to monitoring by the AP-based robust geo-fence tracking engine 204, the GNSS hardware processor 214 may be kept in a passive state so that it can monitor the GNSS signal conditions (e.g., GPS signal conditions) independently, and indicate when signal conditions have improved so that geo-fence tracking may switch back to the GNSS hardware processor 214.

Additionally, while the GPS hardware processor 214 is in a failed-over state (not handling geo-fence tracking), geo-fences may still be added/removed (e.g., per user requests) to the GPS hardware processor 214, even though it is not actively tracking geo-fences. This functionality may assist the GNSS signal monitoring activity since there may be a newly added geo-fence that is closer to the device 102 and may be tracked even with a weaker GPS signal.

Referring again to FIG. 2B, after a failover of geo-fence tracking to the AP-based robust geo-fence tracking engine 204, the GPS hardware processor 214 may monitor conditions of the GPS signal. Upon detecting an improvement of the GPS signal, geo-fence tracking may be switched back from tracking using the AP-based robust geo-fence tracking engine 204 to tracking using the GPS hardware processor 214. After the switching back, the initial state of each of the tracked geo-fences may be set based on a corresponding geo-fence state that is currently stored in the shared state database prior to the switching back. Additionally, after switching back to geo-fence tracking using the GPS hardware processor 214, the geo-fence tracking operation at the AP-based robust geo-fence tracking engine 204 stops.

System State Transitions During Failover

FIG. 5A is a diagram illustrating example state transitions during geo-fence tracking using Global Navigation Satellite System (GNSS) hardware with failover support, in accordance with one or more embodiments. Referring to FIGS. 2B and 5A, the state transition diagram 500 illustrates that initially, the geo-fence tracking system of device 102 (e.g., the location platform 205 and the GNSS hardware 206) does not have any geo-fences and it is in an Idle state 506. At this instance, both geo-fence tracking engines (e.g., the GPS hardware processor 214 on the GNSS hardware 206 and the robust geo-fence tracking engine 204 on the AP 203) are idle and not spending any power.

When the first geo-fence is added (at 516) to the geo-fence tracking system of device 102, the system enters the Hardware Tracked state 502 and the GPS hardware processor 214 may be tasked (by default) with tracking the geo-fence. The geo-fence tracking engine on the GPS hardware processor 214 is then in Active state, and the AP-based robust geo-fence tracking engine 204 is still in Idle state. Newly added geo-fences are also sent to the GPS hardware processor 214 for tracking. In this state (GNSS hardware based tracking), the system spends minimal power during the geo-fence tracking. If all geo-fence are subsequently removed (e.g., 514), the system may transition back to the Idle state 506.

If the GPS signal quality degrades (e.g., as denoted by the GPS Signal Lost event 510 in FIG. 5A), the system may enter the AP Tracked state 504. In this state, the AP-based robust geo-fence tracking engine 204 is brought up and tasked with tracking the geo-fence. Meanwhile, the geo-fence tracking engine on the GPS hardware processor 214 may enter a passive state, in which it may periodically monitor the GPS signal quality. Newly added geo-fences may be tracked by the AP-based robust geo-fence tracking engine 204. However, information about geo-fence additions/removal may also be communicated to the GPS hardware processor 214 since the GPS signal monitoring algorithm may be influenced by the size and proximity of the existing geo-fences (i.e. a close, small geo-fence may need high-quality GPS signal, whereas a far, large geo-fence may be tracked using lower quality GPS signal). If all geo-fences are removed (e.g., 512), the system may transition to the Idle state 506 and both the AP-based and GNSS hardware-based geo-fence tracking engines may become idle.

If the GPS signal quality improves (e.g., as denoted by the GPS Signal Available event 508 in FIG. 5A), the system may transition back to the Hardware Tracked state 502. The AP-based tracking by the robust geo-fence tracking engine 204 may then be shut down, and the GPS hardware processor 214 may take over geo-fence tracking responsibility.

Geo-Fence State Transitions

FIG. 5B is a diagram illustrating example state transitions when a computing device enters, travels through, and exits a geo-fence, in accordance with one or more embodiments. Referring to FIG. 5B, the diagram 550 illustrates example geo-fence state transitions for a computing device 552 that is tracking a geo-fence GF1 (554). For example, at time t1, the device 552 is located outside the geo-fence 554 and an OUTSIDE GF1 state may be recorded in the geo-fence data and state store 210 with regard to geo-fence 554. For example, the shared state database can contain an entry with a unique geo-fence identifier of "GF1" and the current state associated with GF1 of "OUTSIDE". Since there is no geo-fence entry or exit event, no breach alert may be generated by the device 552.

As device 552 moves and enters geo-fence 554, at time t2, the device 552 is located inside the geo-fence 554 and an INSIDE GF1 state may be recorded in the geo-fence data and state store 210 with regard to geo-fence 554. For example, the current state of geo-fence "GF1" in the shared state database can be changed from "OUTSIDE" to "INSIDE". Since there is a geo-fence entry event, an ENTRY breach alert may be generated by the device 552.

At time t3, the device 552 is still located inside the geo-fence 554 and the geo-fence state remains INSIDE GF1. Since there is no change from the previously recorded state (at time t2), the state at time t3 may not be recorded in the geo-fence data and state store 210. Since there is no geo-fence entry or exit event (device 552 is still inside the geo-fence 554), no breach alert may be generated.

As device 552 moves and exits geo-fence 554, at time t4, the device 552 is located outside the geo-fence 554 and an OUTSIDE GF1 state may be recorded in the geo-fence data and state store 210 with regard to geo-fence 554. Since there is a geo-fence exit event, an EXIT breach alert may be generated by the device 552.

Scalability Overview

In some implementations, the one or more programs 202 within the computing device 102 may utilize a large number of geo-fences, which may create a significant memory burden and make it difficult to track all geo-fences at the same time. Even though it may be desirable for the computing device 102 to be able to accept many geo-fences from each of the one or more programs 202, there are resource costs that increase with the number of geo-fences that are being tracked. For example, a simpler implementation may keep all tracked geo-fences in a list in memory to ensure faster access, which results in a higher memory utilization and cost. When a location change is detected, the entire geo-fence list is scanned to check if a geo-fence was entered or exited, which results in higher processing (CPU) utilization and cost.

Region Monitor

In accordance with an example embodiment, this scalability issue of having a large number of geo-fences required by the one or more programs 202 may be resolved by storing all geo-fences in secondary storage such as a database stored in flash memory, on a hard disk, or on a solid-state drive (SSD) (or another type of secondary storage), and only keeping a subset of the geo-fences (e.g., a "monitored region") in on-chip memory (e.g., in primary storage such as RAM) for active tracking.

During active tracking, geo-fence data may be kept in memory for fast access so that the geo-fence can be inspected in instances when the current device position changes. In this regard, by only keeping a subset of the geo-fences as a monitored region in the on-chip memory and only tracking the monitored region, device resource utilization and performance characteristics may be improved.

In an example implementation, the monitored region may include a system geo-fence (referred herein as "outer geo-fence" or a "boundary geo-fence"), which defines the monitored region (as explained herein below). The outer geo-fence may then be monitored for geo-fence exit events to determine when the device exits the current outer geo-fence. If it is detected that the computing device exits the outer geo-fence, the system (e.g., the location platform 205 and the GNSS hardware 206 in device 102) may unload the geo-fences from the current monitored region and may load new geo-fences to create a new monitored region and a new outer geo-fence.

Figure 6:
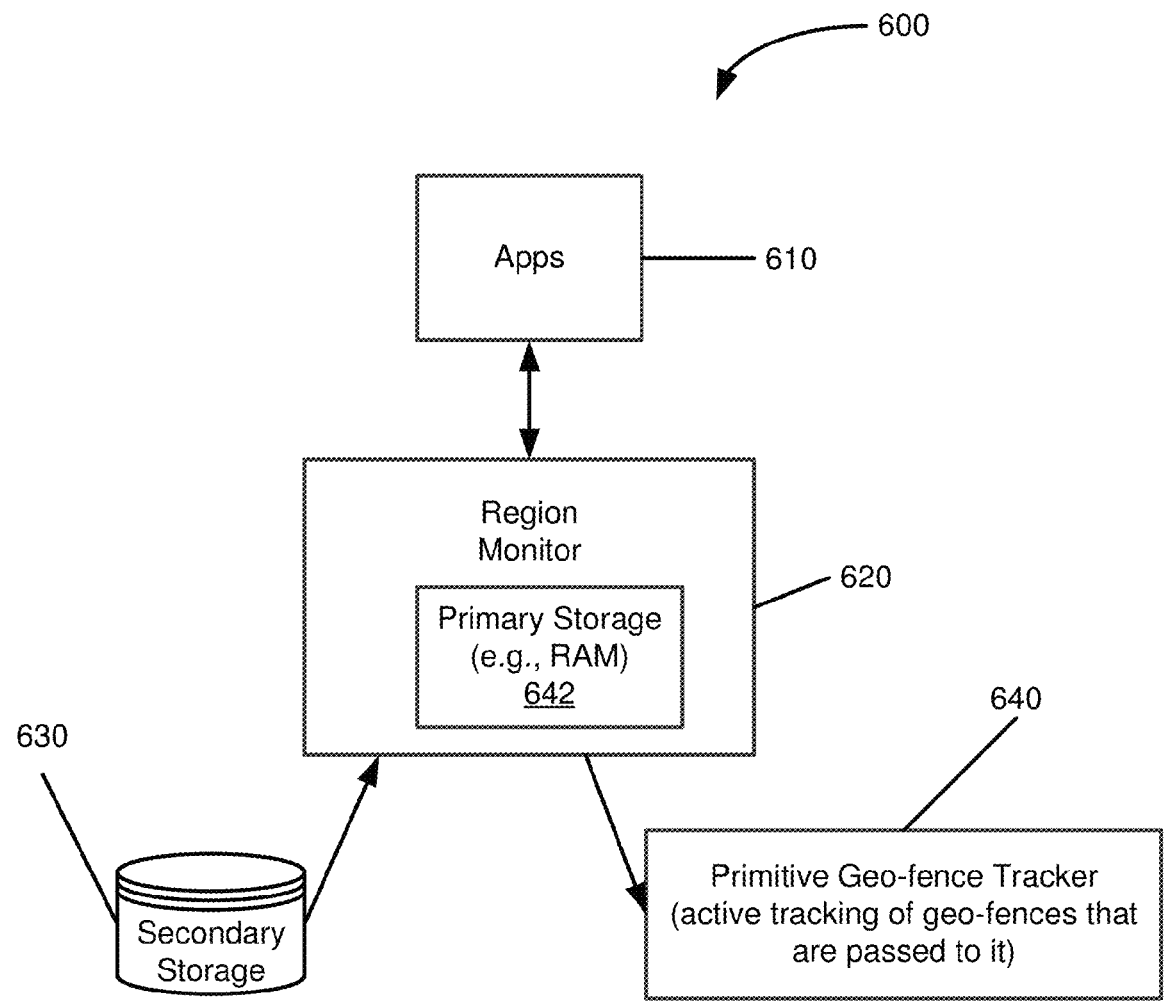
FIG. 6 is a block diagram of an example system that may be used for monitoring a region of actively tracked geo-fences, in accordance with one or more embodiments.

FIG. 6 is a block diagram of an example system that may be used for monitoring a region of actively tracked geo-fences, in accordance with one or more embodiments. Referring to FIG. 6, the example system 600 may comprise one or more applications (or apps) 610, a region monitor 620 with primary storage (e.g., RAM) 642, secondary storage 630 and a primitive geo-fence tracker 640.

The example system 600 may represent a simplified version of the diagram of device 102 illustrated in FIG. 2B, with only a limited number of components illustrated in FIG. 6 for clarity. More specifically, the one or more apps 610 may correspond to (and perform the functionalities of) the one or more programs 202, the region monitor 620 may correspond to the geo-fence region monitor module 212, and the primary storage 642 may correspond to the primary storage 219. The secondary storage 630 may correspond to the geo-fence data and state store 210 or it may comprise a new secondary storage, not illustrated in FIG. 2B (e.g., disk storage, removable memory storage or another type of secondary storage communicatively coupled to the system 600). Additionally, the primitive geo-fence tracker 640 may combine the geo-fence tracking functionalities of the AP-based robust geo-fence tracking engine 204 and the GNSS hardware-based GPS hardware processor 214.

Referring to FIGS. 2B and 6, as the one or more applications 610 add geo-fences for tracking, the location platform 205 stores them in secondary storage 630, which may include a disk database. A subset of the added geo-fences may be loaded from secondary storage 630 to primary storage (e.g., RAM), where they may be kept for active tracking as the "monitored region". Only the geo-fences in the monitored region may be kept in primary storage 642 for tracking by the geo-fence tracker 640.

As the device location moves, the region monitor 620 may load and unload geo-fences as needed, to update the monitored region. More specifically, the region monitor 620 may controls the set of geo-fences in the region, and may use the primitive geo-fence tracker 640 (e.g., the AP-based robust geo-fence tracking engine 204 or the GPS hardware processor 214) to start/stop/tracking of individual geo-fences. The region monitor 620 may be operable to track geo-fences that are close to the current location. In this way, remote geo-fences are not actively tracked and do not take memory/CPU resources within the system 600.

As the device 102 (and system 600) move and change location, the monitored region may be transparently unloaded/reloaded as needed, without any of the one or more applications 610 being aware or receive any indication of the monitored region. In order to keep the monitored region transparent, the following functionalities may be used within the system 600: (a) the system 600 may store the last triggered geo-fence state (i.e. enter/exit) on disk (e.g., on primary storage 642 and/or secondary storage 630) so that if the system 600 restarts, the tracked geo-fences within the monitored region may be restored to their latest state; (b) in instances when the monitored region unloads (or updates), all geo-fences that are currently in a transitioning state may be kept in memory (such geo-fences may then be unloaded as they are resolved, added to a new monitored region, or a new monitored region may be loaded); and (c) the size of the monitored region may be tunable (e.g., selectable prior to initiating geo-fence tracking or tunable on-the-fly during geo-fence tracking), based on CPU/Memory budget for the target tracking platform used by the one or more applications 610.

In an example embodiment, the region monitor 620 may be operable to keep the loaded region in sync as geo-fences are added and removed. For example, in instances when one or more geo-fences are added, the geo-fences may be added to secondary storage 630, and the monitored region is reloaded into primary storage 642 to adjust for the newly added geo-fences (i.e., some of the newly added geo-fences may be close enough to the device and may need to be included in the monitored region). In instances when one or more geo-fences are deleted, the geo-fences may be removed from secondary storage 630 and from the monitored region (if they are currently being tracked). In this case, the monitored region is not reloaded from disk.

In instances when a geo-fence (e.g., a geo-fence currently stored in secondary storage 630) reaches its activation time, then this geo-fence will be treated as if it was just added, causing reload of the monitored region. In instances when a geo-fence reaches its expiration time, then the system 600 (e.g., the region monitor 620) may automatically remove such geo-fence from the monitored region (if it is currently being tracked) or from the secondary storage 630 (if it is not currently being tracked).

Loading a Monitored Region and Boundary Geo-Fence Tracking

Figure 7:
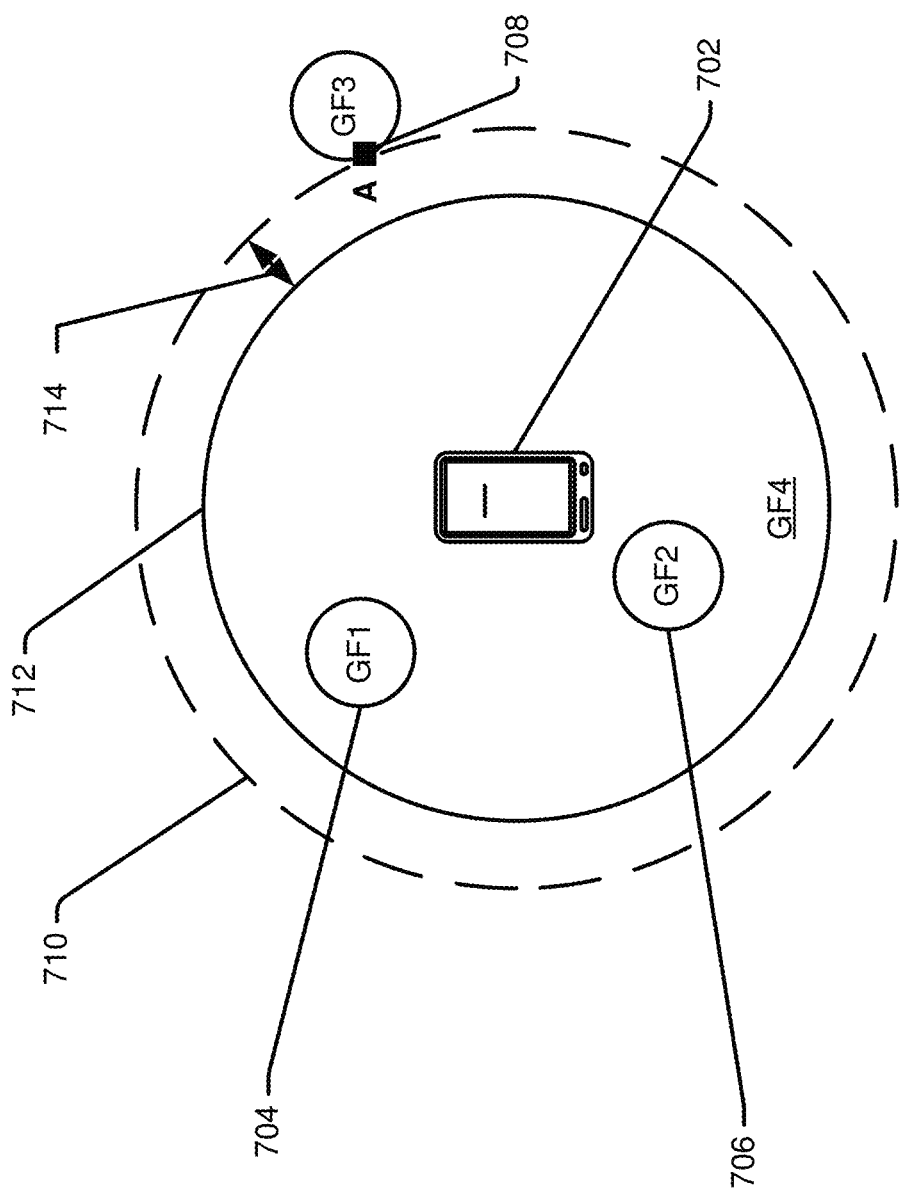
FIG. 7 is a diagram illustrating generation of an example boundary geo-fence used for monitoring a region of actively tracked geo-fences, in accordance with one or more embodiments.

FIG. 7 is a diagram illustrating generation of an example boundary geo-fence used for monitoring a region of actively tracked geo-fences, in accordance with one or more embodiments. Referring to FIGS. 2B and 6-7, in order to load a monitored region, the device 702 (which is equivalent to device 102) may initially select a quota of N geo-fences that will be stored in primary storage 219 (N may be tunable and selected prior to any geo-fence tracking or may be pre-selected or selected on the fly based on a selection criteria). In the example of FIG. 7, N is selected to be equal to 3. After all geo-fence are added (stored) in secondary storage 630, the three geo-fences 704-708 that are closes to device 702 may be loaded from secondary storage 630 to memory (e.g., primary storage 642). In calculating a distance, the distance to a geo-fence may be defined as distance to its edge.

The region monitor 205 may then also load the set of "transitioning" geo-fences from secondary storage 630 to memory (or primary storage 642), which are geo-fences that are not in the current region but may need to be tracked because their previous transition did not complete (e.g., the geo-fence transition was interrupted by a system restart). For example, the device 702 may be inside a transitioning geo-fence and the geo-fence may require a geo-fence enter notification (e.g., LastTriggeredState !=ENTRY). Similarly, the device 702 may be outside a transitioning geo-fence and the geo-fence may require a geo-fence exit notification (e.g., LastTriggeredState==ENTRY).

Referring again to FIG. 7, the furthest geo-fence from device 702 is geo-fence 708, with the furthest point along the perimeter of geo-fence 708 being point A. A monitored region may then be set as the boundary geo-fence 710 represented as a circle encompassing all three loaded geo-fences 704-708, with a radius equal to the distance from the current location of the device 702 to the innermost point (point A) along the perimeter of the furthest located geo-fence (geo-fence 708). In this regard, in setting up a perimeter (or a boundary) geo-fence, the closest N geo-fences may be loaded (in reference to FIG. 7, N=3), where a distance to a geo-fence may be defined as the distance to its closest edge (i.e., the innermost point A of the geo-fence 708)

The system 600 may then use the underlying geo-fence tracker 640 (e.g., GNSS hardware-based GPS hardware engine 214 or the AP-based robust geo-fence tracking engine 204) to start tracking the N (in FIG. 7, N=3) geo-fences, any transitioning geo-fences, and the boundary geo-fence 710. The boundary geo-fence 710 may be tracked as a regular geo-fence, without requiring any special functionality. The region monitor 620 may relay all enter/exit events for the tracked geo-fences to the corresponding applications 610 that own them.

Tracking of the N selected geo-fences (704-708), any transitioning geo-fences, and the boundary geo-fence 710 may continue indefinitely, and will only transition if an exit event is triggered for the boundary geo-fence 710 (which indicates that the device 702 has moved enough and a new monitored region has to be loaded into primary storage 642). In this regard, a region (e.g., a new boundary geo-fence may be set) if an exit event is triggered on an outermost geo-fence of the current boundary geo-fence. At this point, the region monitor 620 may unload all geo-fences from the monitored region, with the exception of any geo-fences that are currently transitioning state (i.e. waiting to trigger enter or exit event after their dwell time expires). A new monitored region may then be loaded as explained above.

In an example embodiment of the disclosure, after initially setting up the boundary geo-fence 710 as having a radius equal to the distance from the current location of device 702 to the innermost point A of the furthest geo-fence 708, the radius of the boundary geo-fence may be reduced by a predetermined amount 714. In this regard, the initial boundary geo-fence 710 has been slightly reduced to encompass the area bound by the circle 712. Such slight boundary geo-fence adjustment may significantly improve the sensitivity of the device 702 for triggering the boundary geo-fence exit event and initiating a reload of a new monitored region.

Monitored Region Reload

Figure 8:
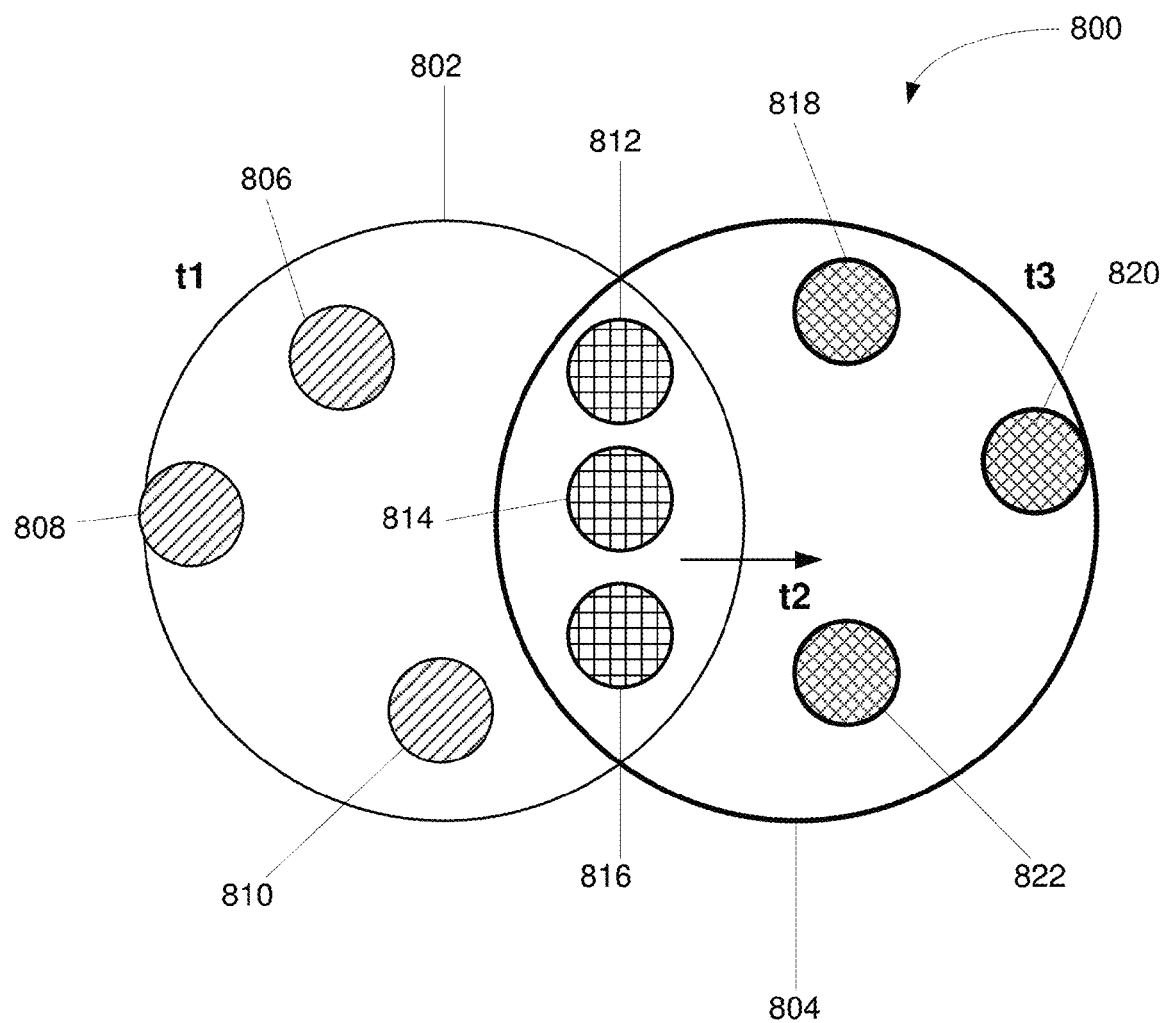
FIG. 8 is a diagram illustrating a monitored region reload and creating a new boundary geo-fence, in accordance with one or more embodiments.

FIG. 8 is a diagram illustrating a monitored region reload and creating a new boundary geo-fence, in accordance with one or more embodiments. Referring to FIGS. 2B and 8, at time t1, the location platform 205 may be actively tracking geo-fences 806-816 (e.g., N=6) with a boundary geo-fence 802. At time t2, the boundary geo-fence 802 is crossed and the tracking engine (e.g., 640) triggers a geo-fence exit alert. The region monitor 620 may then initiate a region reload. At time t3, the new monitored region may be fully loaded from secondary storage 630 to memory (e.g., primary storage 642) and may include geo-fences 812-822 (N=6). After the reload of the new monitored region, geo-fence 806-810 have been dropped from tracking, and the geo-fence tracking engine 640 is now actively tracking the geo-fences 812-822 as well as the boundary geo-fence 804.

Example Processing Flow for Region

Figure 9:
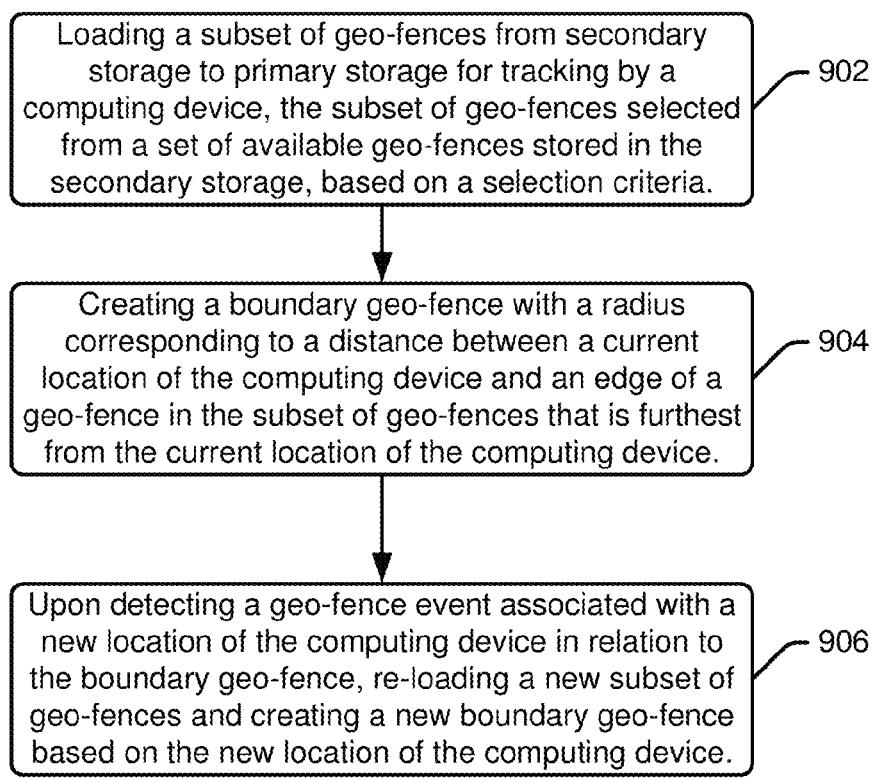
FIG. 9 is a flow diagram illustrating an example process for monitoring a region of actively tracked geo-fences, in accordance with one or more embodiments.

FIG. 9 is a flow diagram illustrating an example process for monitoring a region of actively tracked geo-fences, in accordance with one or more embodiments. Referring to FIGS. 2B and 6-9, the example process 900 may start at 902, when the region monitor 620 may load a subset of geo-fences from secondary storage 630 to primary storage 642 for tracking by a computing device (e.g., 600 or 102). The subset of geo-fences may be selected from a set of available geo-fences stored in the secondary storage 630, based on a selection criteria. The selection criteria may be based on a distance of each of the available geo-fences to a current location of the computing device, a maximum number of geo-fences established for the subset of geo-fences, or another selection criteria.

At 904, the region monitor 620 may create a boundary geo-fence (e.g., 710) with a radius corresponding to a distance between a current location of the computing device and an edge of a geo-fence (e.g., 708) in the subset of geo-fences that is furthest from the current location of the computing device. At 906, upon detecting a geo-fence event associated with a new location of the computing device in relation to the boundary geo-fence (e.g., new device location at time t2 triggers monitored region reload), the region monitor 620 may re-load a new subset of geo-fences (e.g., new monitored region is formed including geo-fences 812-822), and may create a new boundary geo-fence (e.g., 804) based on the new location of the computing device.

Computing Systems

Figure 10:
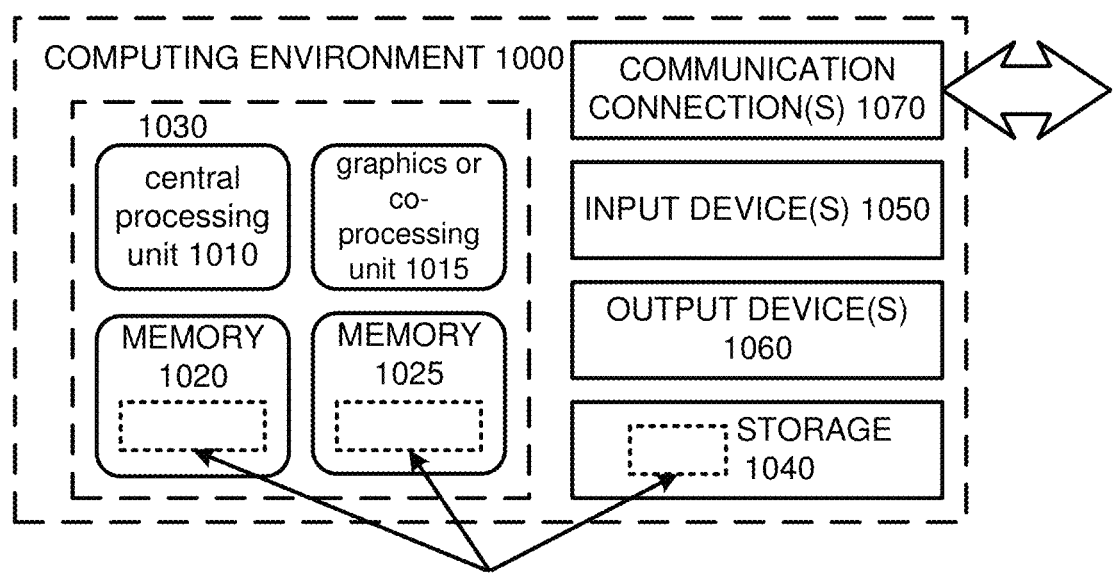
FIG. 10 is a diagram of an example computing system, in which some described embodiments can be implemented.

FIG. 10 is a diagram of an example computing system, in which some described embodiments can be implemented. The computing system 1000 is not intended to suggest any limitation as to scope of use or functionality, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may also have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. For video encoding, the input device(s) 1050 may be a camera, video card, TV tuner card, or similar device that accepts video input in analog or digital form, or a CD-ROM or CD-RW that reads video samples into the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud-Supported Environment

Figure 11:
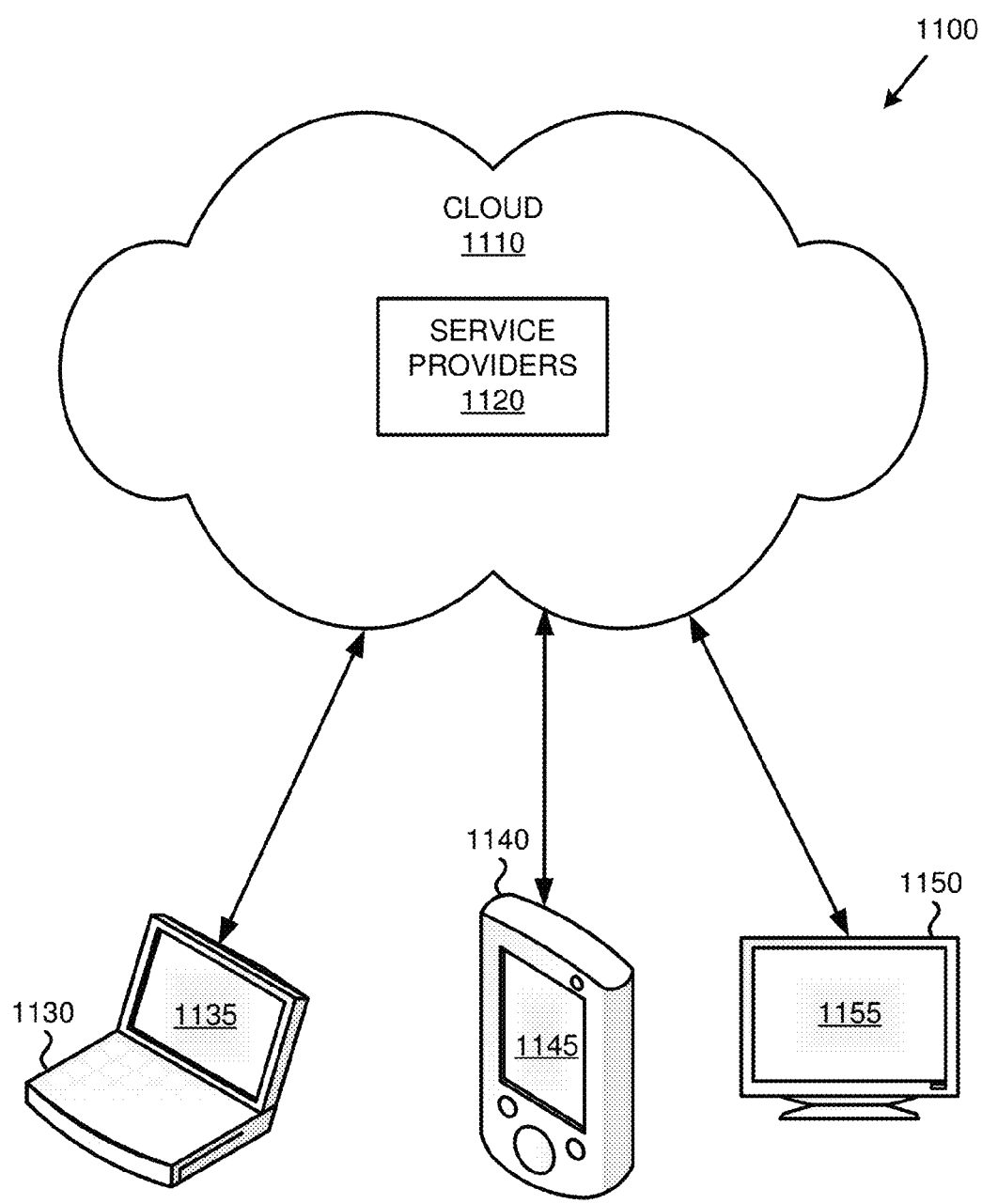
FIG. 11 illustrates a generalized example of a suitable cloud-supported environment, in which described embodiments, techniques, and technologies may be implemented.

FIG. 11 illustrates a generalized example of a suitable cloud-supported environment 1100, in which described embodiments, techniques, and technologies may be implemented. In the example environment 1100, various types of services (e.g., computing services) are provided by a cloud 1110. For example, the cloud 1110 can comprise a collection of computing devices, which may be located centrally or distributed, that provide cloud-based services to various types of users and devices connected via a network such as the Internet. The implementation environment 1100 can be used in different ways to accomplish computing tasks. For example, some tasks (e.g., processing user input and presenting a user interface) can be performed on local computing devices (e.g., connected devices 1130, 1140, 1150), while other tasks (e.g., storage of data to be used in subsequent processing) can be performed in the cloud 1110.

In example environment 1100, the cloud 1110 provides services for connected devices 1130, 1140, 1150 with a variety of screen capabilities. Connected device 1130 represents a device with a computer screen 1135 (e.g., a mid-size screen). For example, connected device 1130 could be a personal computer such as desktop computer, laptop, notebook, netbook, or the like. Connected device 1140 represents a device with a mobile device screen 1145 (e.g., a small size screen). For example, connected device 1140 could be a mobile phone, smart phone, personal digital assistant, tablet computer, and the like. Connected device 1150 represents a device with a large screen 1155. For example, connected device 1150 could be a television screen (e.g., a smart television) or another device connected to a television (e.g., a set-top box or gaming console) or the like.

One or more of the connected devices 1130, 1140, and/or 1150 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1100. For example, the cloud 1110 can provide services for one or more computers (e.g., server computers) without displays.

Services can be provided by the cloud 1110 through service providers 1120, or through other providers of online services (not depicted). For example, cloud services can be customized to the screen size, display capability, and/or touchscreen capability of a particular connected device (e.g., connected devices 1130, 1140, and/or 1150).

In the example environment 1100, the cloud 1110 provides one or more of the technologies and solutions described herein to the various connected devices 1130, 1140, and/or 1150 using, at least in part, the service providers 1120. For example, the service providers 1120 can provide a centralized solution for various cloud-based services. The service providers 1120 can manage service subscriptions for users and/or devices (e.g., for the connected devices 1130, 1140, 1150 and/or their respective users).

Mobile Devices

Figure 12:
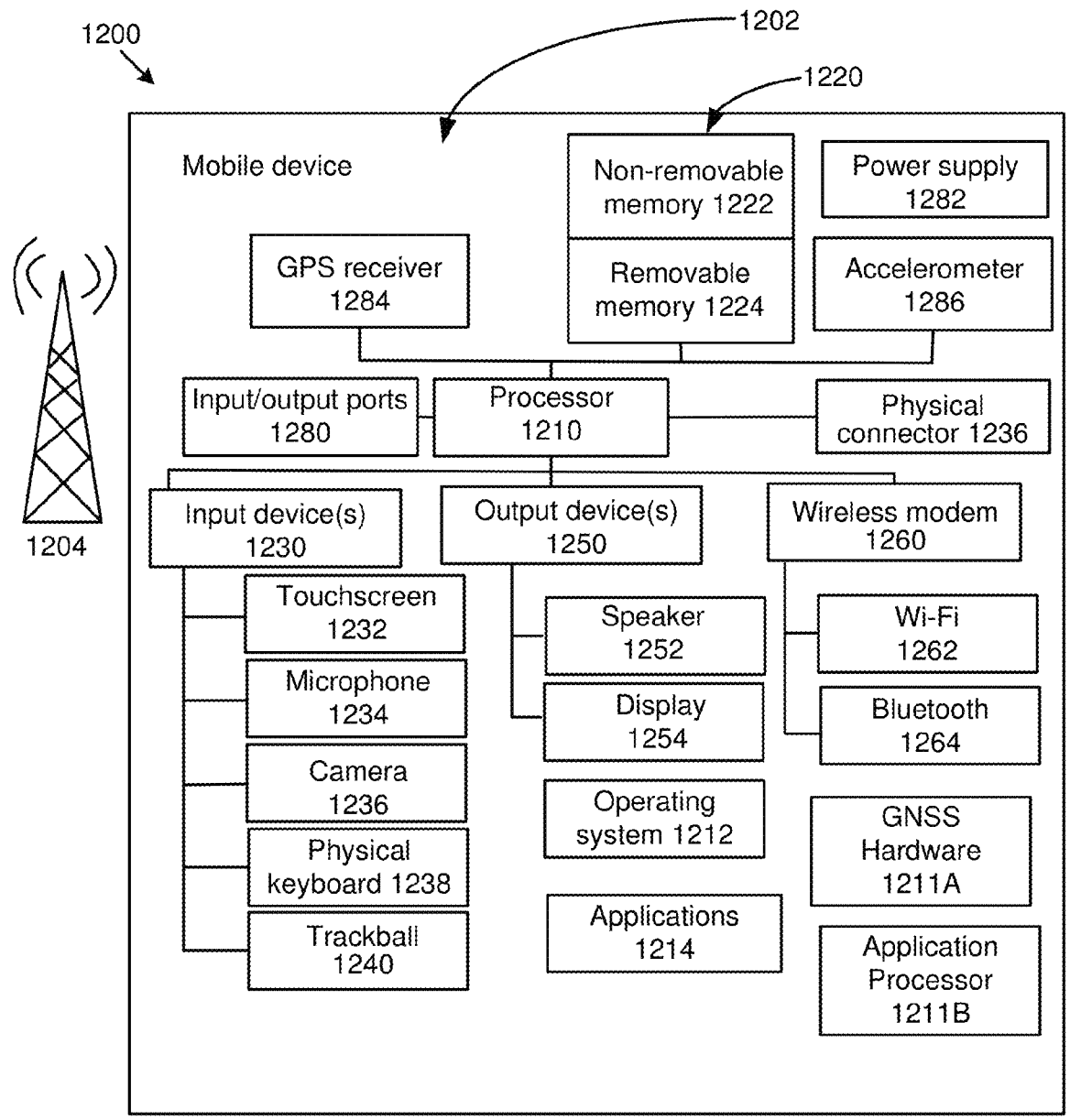
FIG. 12 is an example mobile device that can be used in conjunction with the technologies described herein.

FIG. 12 is an example mobile device that can be used in conjunction with the technologies described herein. Referring to FIG. 12, the example mobile device 1200 may include a variety of optional hardware and software components, shown generally at 1202. Any components 1202 in the mobile device 1200 can communicate with any other component, although not all connections are shown, for ease of illustration. The mobile device 1200 can be any of a variety of computing devices (e.g., cell phone, smartphone, handheld computer, Personal Digital Assistant (PDA), etc.) and can allow wireless two-way communications with one or more mobile communications networks 1204, such as a cellular, satellite, or other network.

The illustrated mobile device 1200 can include a controller or processor 1210 (e.g., signal processor, microprocessor, ASIC, or other control and processing logic circuitry) for performing such tasks as signal coding, data processing, input/output processing, power control, and/or other functions. An operating system 1212 can control the allocation and usage of the components 1202 and support for one or more application programs 1214. The application programs can include common mobile computing applications (e.g., email applications, calendars, contact managers, web browsers, messaging applications), or any other computing application. Functionality 1213 for accessing an application store can also be used for acquiring and updating application programs 1214.

The illustrated mobile device 1200 can include memory 1220. Memory 1220 can include non-removable memory 1222 and/or removable memory 1224. The non-removable memory 1222 can include RAM, ROM, flash memory, a hard disk, or other well-known memory storage technologies. The removable memory 1224 can include flash memory or a Subscriber Identity Module (SIM) card, which is well known in GSM communication systems, or other well-known memory storage technologies, such as "smart cards." The memory 1220 can be used for storing data and/or code for running the operating system 1212 and the applications 1214. Example data can include web pages, text, images, sound files, video data, or other data sets to be sent to and/or received from one or more network servers or other devices via one or more wired or wireless networks. The memory 1220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1200 can support one or more input devices 1230, such as a touchscreen 1232, microphone 1234, camera 1236, physical keyboard 1238 and/or trackball 1240, and one or more output devices 1250, such as a speaker 1252 and a display 1254. Other possible output devices (not shown) can include piezoelectric or other haptic output devices. Some devices can serve more than one input/output function. For example, touchscreen 1232 and display 1254 can be combined in a single input/output device.

The input devices 1230 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1212 or applications 1214 can comprise speech-recognition software as part of a voice user interface that allows a user to operate the device 1200 via voice commands. Further, the device 1200 can comprise input devices and software that allows for user interaction via a user's spatial gestures, such as detecting and interpreting gestures to provide input to a gaming application.

A wireless modem 1260 can be coupled to an antenna (not shown) and can support two-way communications between the processor 1210 and external devices, as is well understood in the art. The modem 1260 is shown generically and can include a cellular modem for communicating with the mobile communication network 1204 and/or other radio-based modems (e.g., Bluetooth 1264 or Wi-Fi 1262). The wireless modem 1260 is typically configured for communication with one or more cellular networks, such as a GSM network for data and voice communications within a single cellular network, between cellular networks, or between the mobile device and a public switched telephone network (PSTN).

The mobile device can further include at least one input/output port 1280, a power supply 1282, a satellite navigation system receiver 1284, such as a Global Positioning System (GPS) receiver, an accelerometer 1286, and/or a physical connector 1290, which can be a USB port, IEEE 1394 (FireWire) port, and/or RS-232 port. The illustrated components 1202 are not required or all-inclusive, as any components can be deleted and other components can be added.

In an example embodiment of the disclosure, the mobile device 1200 may further include a GNSS hardware 1211A and an application processor 1211B, which may be separate from or implemented as part of the device processor 1210. Furthermore, the GNSS hardware 1211A and an application processor 1211B may have functionalities similar to the GNSS hardware 206 and the AP 203, as explained herein in reference to FIGS. 2A-2C.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 10, computer-readable storage media include memory 1020 and 1025, and storage 1040. By way of example and with reference to FIG. 12, computer-readable storage media may include memory and storage 1220, 1222, and 1224. The term "computer-readable storage media" does not include signals and carrier waves. In addition, the term "computer-readable storage media" does not include communication connections (e.g., 1070, 1260, 1262, and 1264).

In accordance with an example embodiment of the disclosure, a method may include tracking one or more geo-fences using a GNSS (e.g., GPS) hardware processor within a computing device. The tracking may use at least one GNSS (e.g., GPS) signal. State changes of the one or more geo-fences during the tracking may be saved in a shared state database. The shared state database may be shared between the GNSS hardware processor and an application processor within the computing device. Upon detecting a deterioration of the at least one GNSS signal, tracking the one or more geo-fences using the GNSS hardware processor may be switched to tracking the one or more geo-fences using the application processor. After the switching, an initial state of each of the one or more geo-fences may be set using states currently stored in the shared state database prior to the switching.

In accordance with another example embodiment of the disclosure, a computing device may include a GNSS (e.g., GPS) hardware processor configured to track one or more geo-fences using at least one GNSS (e.g., GPS) signal; an application processor configured to take over tracking the one or more geo-fences upon deterioration of the at least one GNSS signal; and a shared state database configured to store state changes of the one or more geo-fences during the tracking. The shared state database may be shared between the GNSS hardware processor and the application processor. Upon switching from tracking the one or more geo-fences using the GNSS hardware processor to tracking the one or more geo-fences using the application processor, the application processor may be operable to set an initial state of each of the one or more geo-fences using states currently stored in the shared state database prior to the switching. Upon detecting an improvement of the at least one GNSS signal, tracking the one or more geo-fences using the application processor may be switched to tracking the one or more geo-fences using the GNSS hardware processor. After the switching back, an initial state of each of the one or more geo-fences may be set using the states currently stored in the shared state database prior to the switching back.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, comprising:
    tracking one or more geo-fences using a Global Navigation Satellite System (GNSS) hardware processor within a computing device, wherein:
        the tracking uses at least one GNSS signal; and
        state changes of the one or more geo-fences during the tracking are saved in a shared state database, the shared state database shared between the GNSS hardware processor and an application processor within the computing device; and
    upon detecting inability by the GNSS hardware processor to determine location:
        switching from tracking the one or more geo-fences using the GNSS hardware processor to tracking the one or more geo-fences using the application processor; and
        after the switching, setting an initial state of each of the one or more geo-fences using states currently stored in the shared state database prior to the switching.

2. The method according to claim 1, comprising identifying, at the computing device, the one or more geo-fences for tracking and wherein:
    the GNSS signal comprises a GPS signal and the GNSS hardware processor comprises a GPS hardware processor operable to determine location using at least one GPS signal.

3. The method according to claim 2, wherein the identifying comprises at least one of:
    retrieving the one or more geo-fences from storage; and
    receiving the one or more geo-fences from at least one application executing on the computing device.

4. The method according to claim 1, comprising:
    detecting occurrence of at least one geo-fence event based on a location of the computing device in proximity to a selected one of the one or more geo-fences.

5. The method according to claim 4, wherein the at least one geo-fence event comprises a geo-fence enter event or a geo-fence exit event.

6. The method according to claim 4, comprising:
    upon detecting the occurrence of the at least one geo-fence event, recording a state change in the shared state database for the selected one of the one or more geo-fences.

7. The method according to claim 6, wherein the state change comprises:
    an entry state change indicating that a location of the computing device has moved from outside the selected one of the one or more geo-fences to inside the selected one of the one or more geo-fences; and
    an exit state change indicating that a location of the computing device has moved from inside the selected one of the one or more geo-fences to outside the selected one of the one or more geo-fences.

8. The method according to claim 1, comprising:
monitoring, after the switching, condition of the at least one GNSS signal using the GNSS hardware processor.

9. The method according to claim 8, wherein the GNSS hardware processor is in a passive state during the monitoring.

10. The method according to claim 8, comprising:
upon detecting ability of the GNSS processor to determine location:
  switching from tracking the one or more geo-fences using the application processor to tracking the one or more geo-fences using the GNSS hardware processor; and
  after the switching, setting an initial state of each of the one or more geo-fences using the states currently stored in the shared state database prior to the switching.

11. The method according to claim 1, comprising:
saving the state changes of the one or more geo-fences during the tracking in the shared state database and in a secondary storage accessible by the computing device.

12. A computing device, comprising:
a GNSS hardware processor configured to track one or more geo-fences using at least one GNSS signal;
an application processor configured to take over tracking the one or more geo-fences upon deterioration of the at least one GNSS signal; and
a shared state database configured to store state changes of the one or more geo-fences during the tracking, wherein:
  the shared state database is shared between the GNSS hardware processor and the application processor;
  upon switching from tracking the one or more geo-fences using the GNSS hardware processor to tracking the one or more geo-fences using the application processor, the application processor being operable to set an initial state of each of the one or more geo-fences using states currently stored in the shared state database prior to the switching; and
  upon detecting an improvement of the at least one GNSS signal:
    switching back from tracking the one or more geo-fences using the application processor to tracking the one or more geo-fences using the GPS hardware processor; and
    after the switching back, setting an initial state of each of the one or more geo-fences using the states currently stored in the shared state database prior to the switching back.

13. The computing device of claim 12, comprising:
at least one location determination module operable to determine location of the computing device in relation to the one or more geo-fences upon switching to tracking the one or more geo-fences using the application processor.

14. The computing device of claim 13, wherein:
the at least one location determination module is operable to determine the location of the computing device based on one or more of Wi-Fi signal positioning, network address positioning, and cellular signal positioning.

15. The computing device of claim 12, wherein the GNSS hardware processor and the application processor are both configured to:
detect occurrence of at least one geo-fence event based on a location of the computing device in proximity to a selected one of the one or more geo-fences, wherein the at least one geo-fence event comprises a geo-fence enter event or a geo-fence exit event; and
upon detecting the occurrence of the at least one geo-fence event, record a state change in the shared state database for the selected one of the one or more geo-fences.

16. The computing device of claim 15, wherein the state change comprises:
an entry state change indicating that a location of the computing device has moved from outside the selected one of the one or more geo-fences to inside the selected one of the one or more geo-fences; and
an exit state change indicating that a location of the computing device has moved from inside the selected one of the one or more geo-fences to outside the selected one of the one or more geo-fences.

* * * * *